(12) United States Patent
Sanchez Herrero

(10) Patent No.: US 9,037,730 B2
(45) Date of Patent: May 19, 2015

(54) APPARATUSES AND METHODS FOR HANDLING MACHINE-TO-MACHINE COMMUNICATIONS

(75) Inventor: Juan Antonio Sanchez Herrero, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 305 days.

(21) Appl. No.: 13/580,030

(22) PCT Filed: Feb. 19, 2010

(86) PCT No.: PCT/EP2010/052113
§ 371 (c)(1),
(2), (4) Date: Aug. 20, 2012

(87) PCT Pub. No.: WO2011/101032
PCT Pub. Date: Aug. 25, 2011

(65) Prior Publication Data
US 2013/0013793 A1  Jan. 10, 2013

(51) Int. Cl.
*G06F 15/16* (2006.01)
*H04W 4/00* (2009.01)
*H04W 8/04* (2009.01)
*H04L 29/08* (2006.01)
*H04W 8/00* (2009.01)
(Continued)

(52) U.S. Cl.
CPC ............... *H04W 4/005* (2013.01); *H04W 8/04* (2013.01); *H04L 67/12* (2013.01); *H04W 8/005* (2013.01); *H04W 80/08* (2013.01); *H04W 88/182* (2013.01); *H04L 67/28* (2013.01)

(58) Field of Classification Search
USPC .................................. 709/204, 223, 227, 228
See application file for complete search history.

(56) References Cited

U.S. PATENT DOCUMENTS

2010/0057485 A1* 3/2010 Luft ................................. 705/1

OTHER PUBLICATIONS

Mobile and Ubiquitous Systems: Networking and Services, 2005. MobiQuitous 2005. The Second Annual International Conference on, Issue Date: Jul. 17-21, 2005, Written by: Trossen, Dirk; Pavel, D.*

(Continued)

*Primary Examiner* — Joseph E Avellino
*Assistant Examiner* — Marshall McLeod
(74) *Attorney, Agent, or Firm* — Baker Botts, LLP

(57) ABSTRACT

The present invention faces the issues of communicating Machine-To-Machine Devices with Machine-To-Machine Servers for remote control of said Machine-To-Machine Devices (4a1-4a9) through public telecommunication networks and, in particular, where the number of Machine-To-Machine Devices is very high and the information transmitted for each Machine-To-Machine Device is very low in terms of volume and frequency. In order to solve this issue, the present invention provides for an enhanced architecture and associated mechanisms to allow, on the one hand, mobility management so that each Machine-To-Machine Device can be more freely moved from an area controlled by a first Gateway associated with a first Machine-To-Machine Media Handler (2a) to an area controlled by a second Gateway associated with a second Machine-To-Machine Media Handler (2b); and, on the other hand, aggregation of information streams to or from a plurality of M2M Devices using a unique communication channel between a Machine-To-Machine Media Handler and the Machine-To-Machine Server (3a, 3b), through the public telecommunication network.

22 Claims, 14 Drawing Sheets

(51) Int. Cl.
*H04W 80/08* (2009.01)
*H04W 88/18* (2009.01)

(56) References Cited

OTHER PUBLICATIONS

International Search Report for PCT/EP2010/052113, mailed May 20, 2010.
International Preliminary Report on Patentability for PCT/EP2010/052113, mailed Jun. 6, 2012, with Amended sheets.
Schulzrinne, Henning G. et al., "The Session Initiation Protocol: Providing Advanced Telephony Services Across the Internet", Bell Labs Technical Journal, vol. 3, No. 4, (Oct. 1, 1998), pp. 144-160.
Oikarinen, D et al., "Internet Relay Chat Protocol; rfc1459.txt", IETF Standard; Internet Engineering Task Force, IETF, CH, (May 1, 1993), pp. 4-5.
Gnawali, et al., "The Tenet Architecture for Tiered Sensor Networks", ACM SENSYS '06, (Nov. 1, 2006), pp. 153-166.
"The Extensible Stylesheet Language Family (XSL)" by Liam Quin, Sep. 15, 2014.
"PMML 3.2—Transformation Dictionary & Derived Fields" by Data Mining Group, retrieved on Sep. 17, 2014.
Report on potential for standardization of M2M (Machine-to-Machine communications) at ETSI; Source: Board M2M ad hoc group, Nov. 12, 2008.

\* cited by examiner

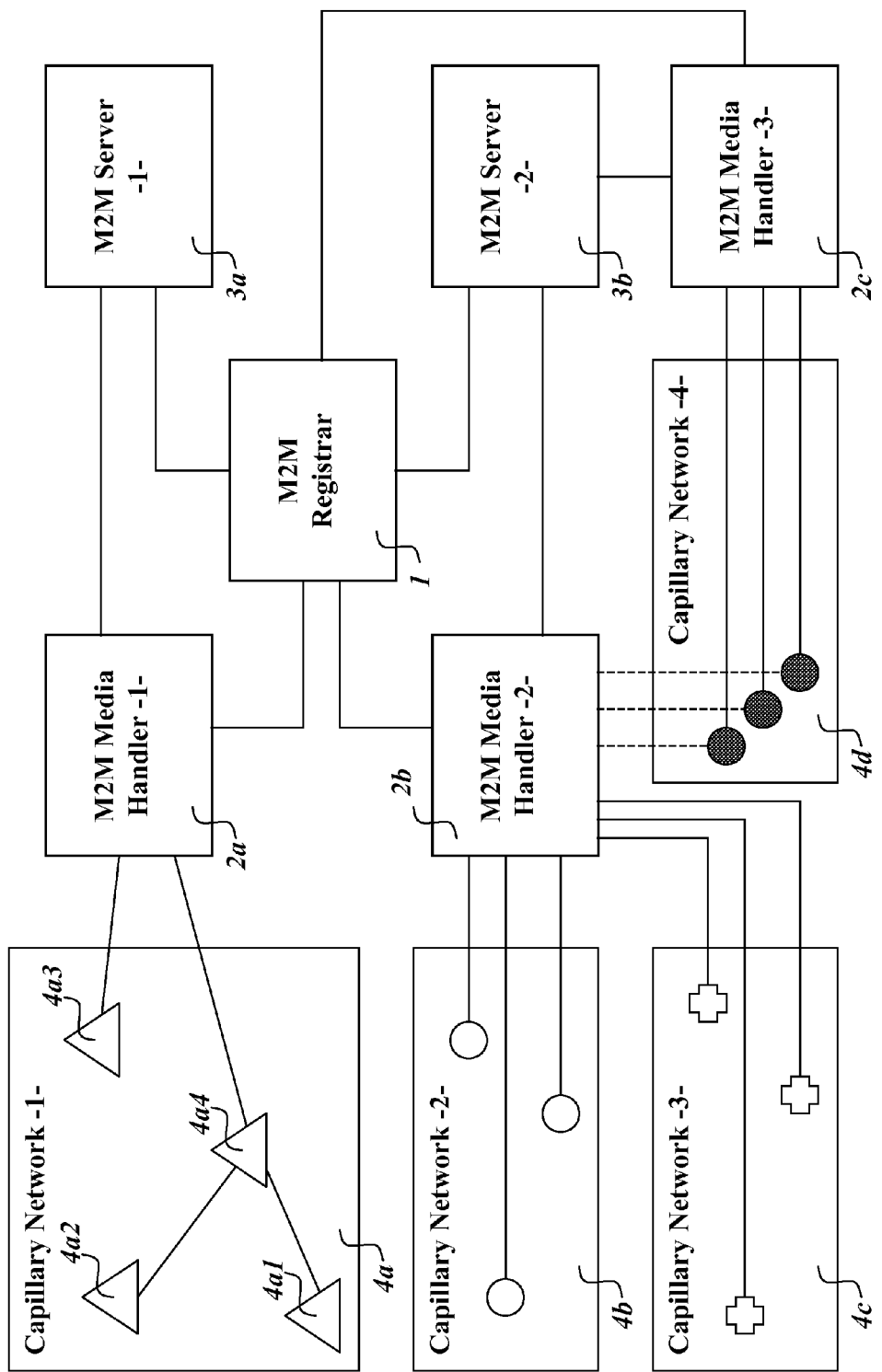
FIG. -1-

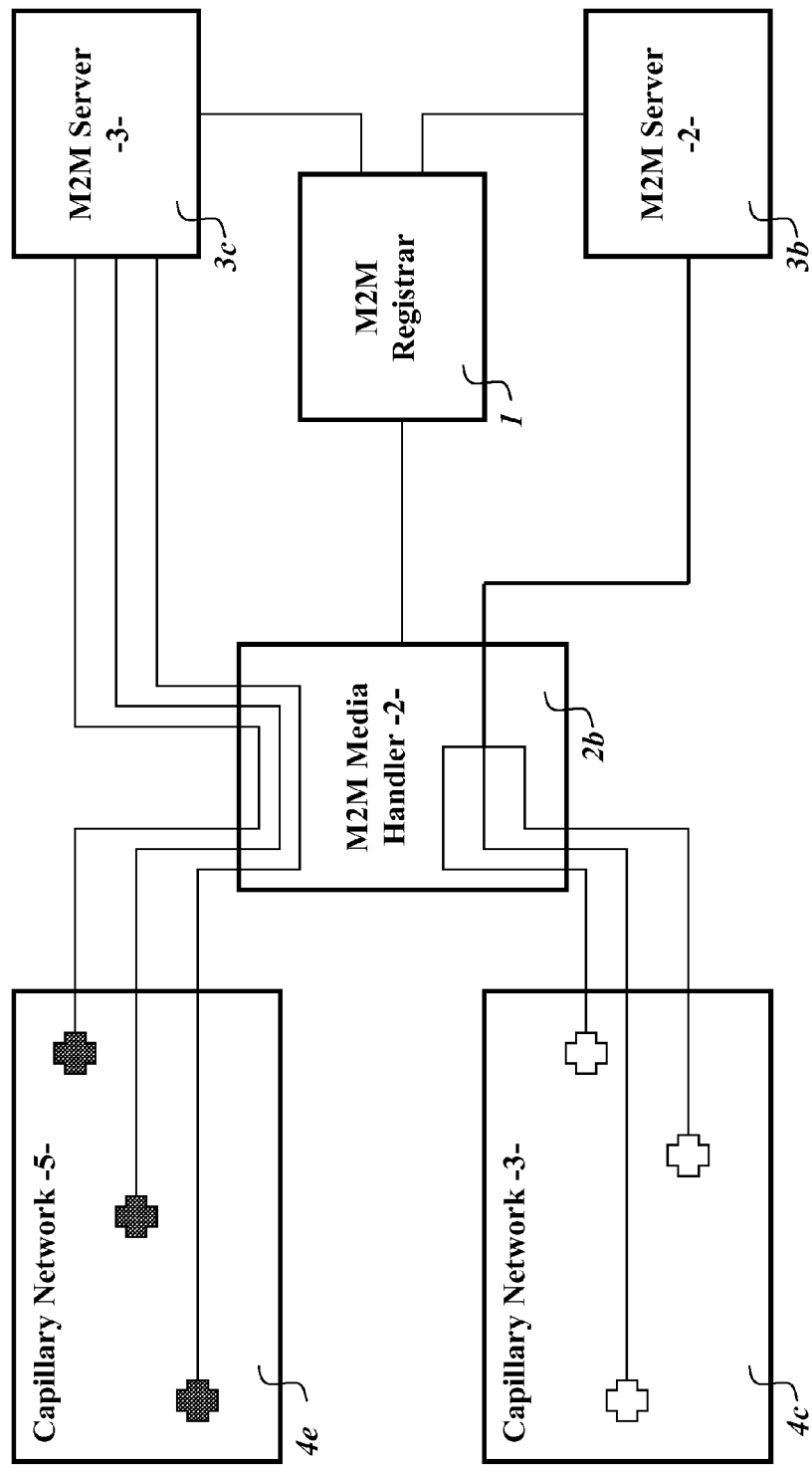
FIG. -2-

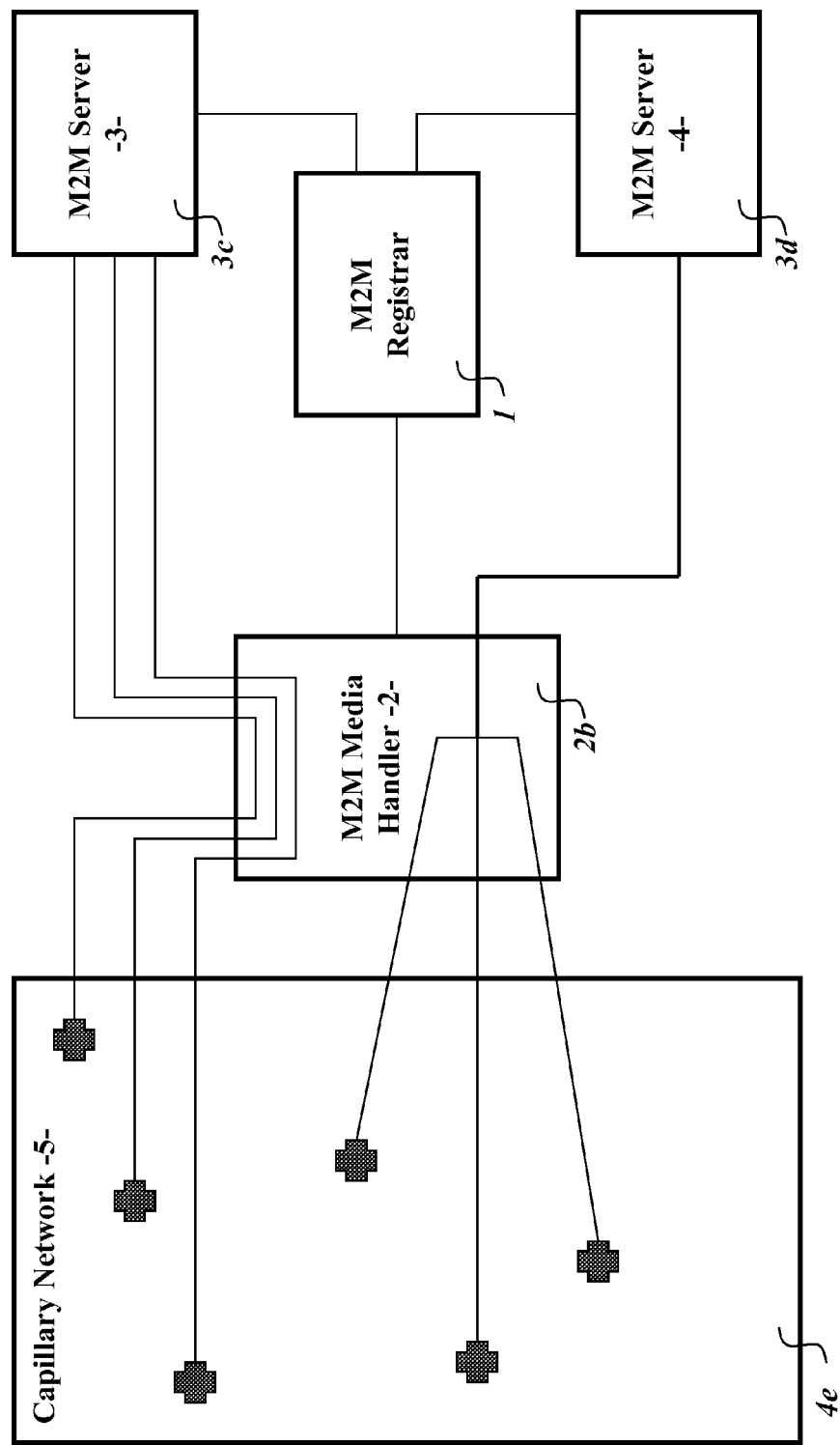
FIG. -3-

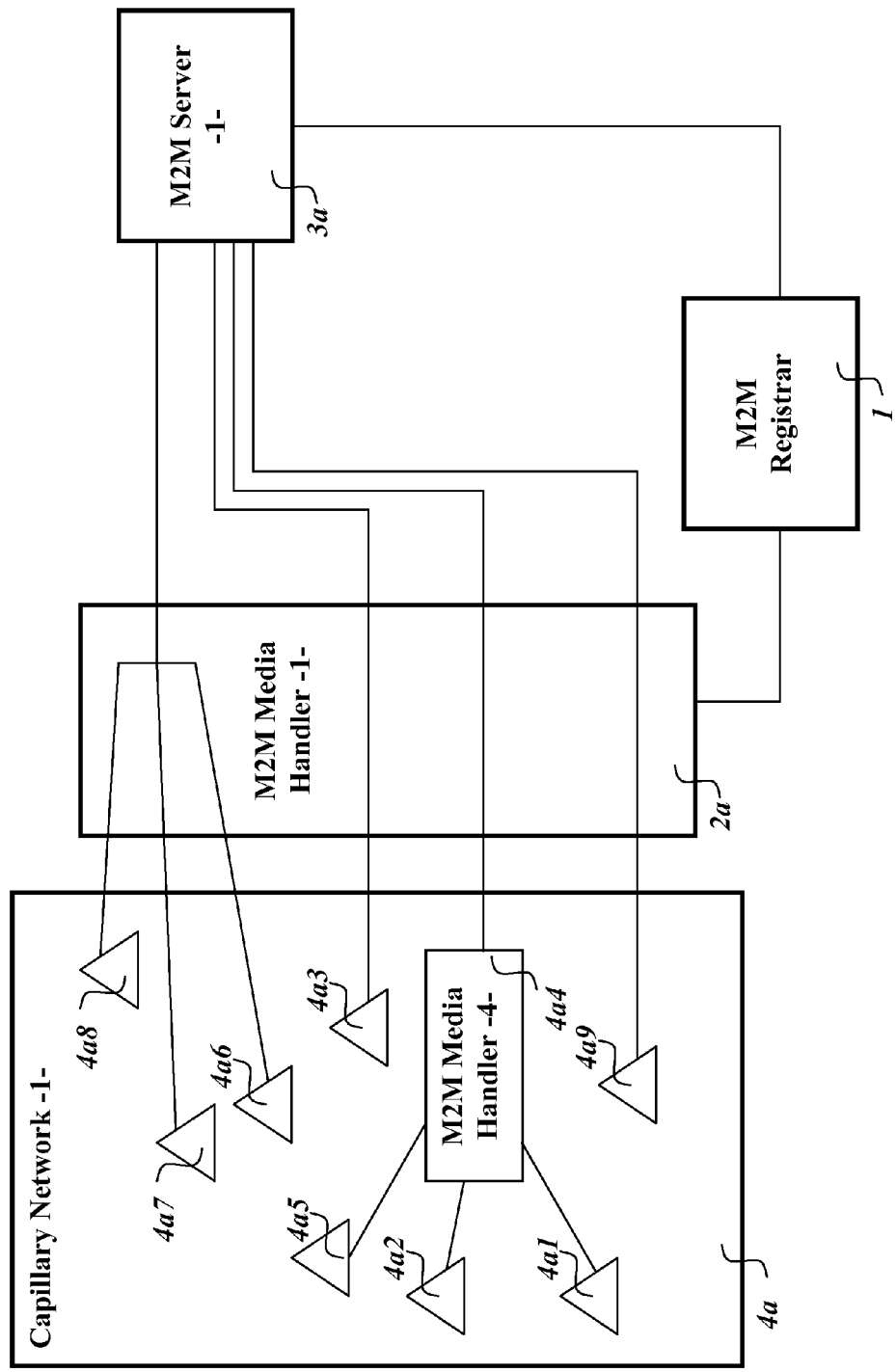
FIG. -4-

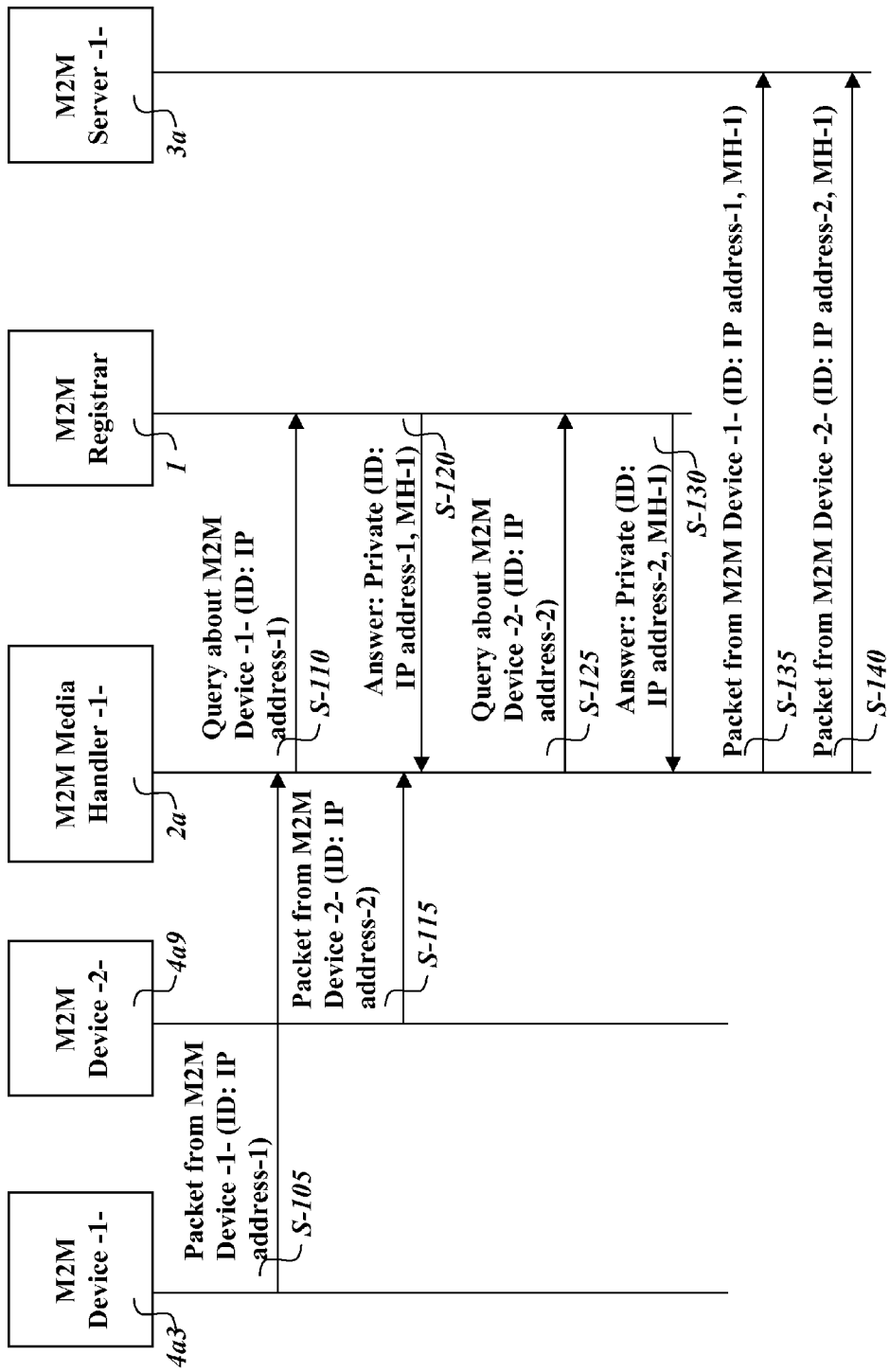
FIG. -5-

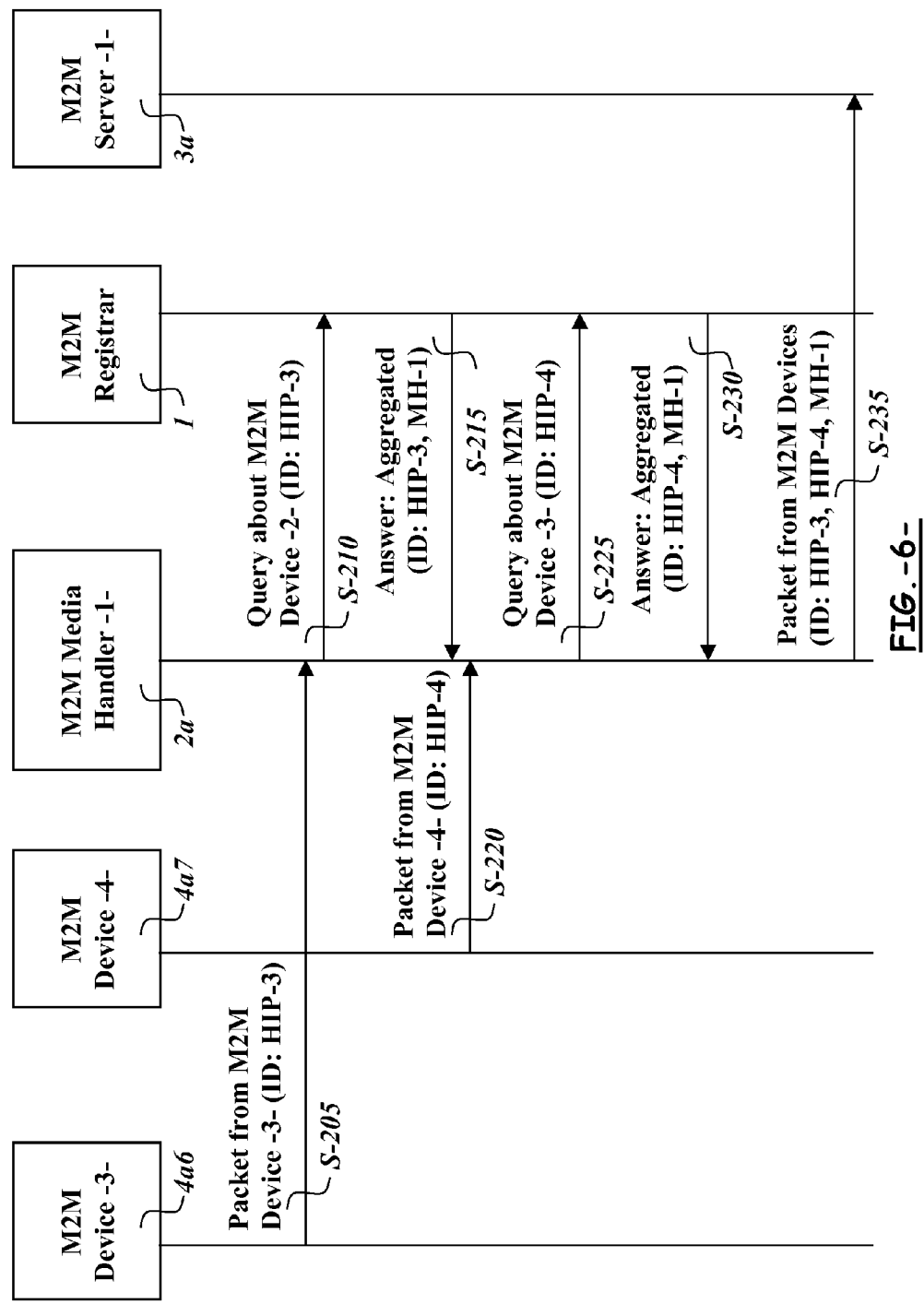
FIG. -6-

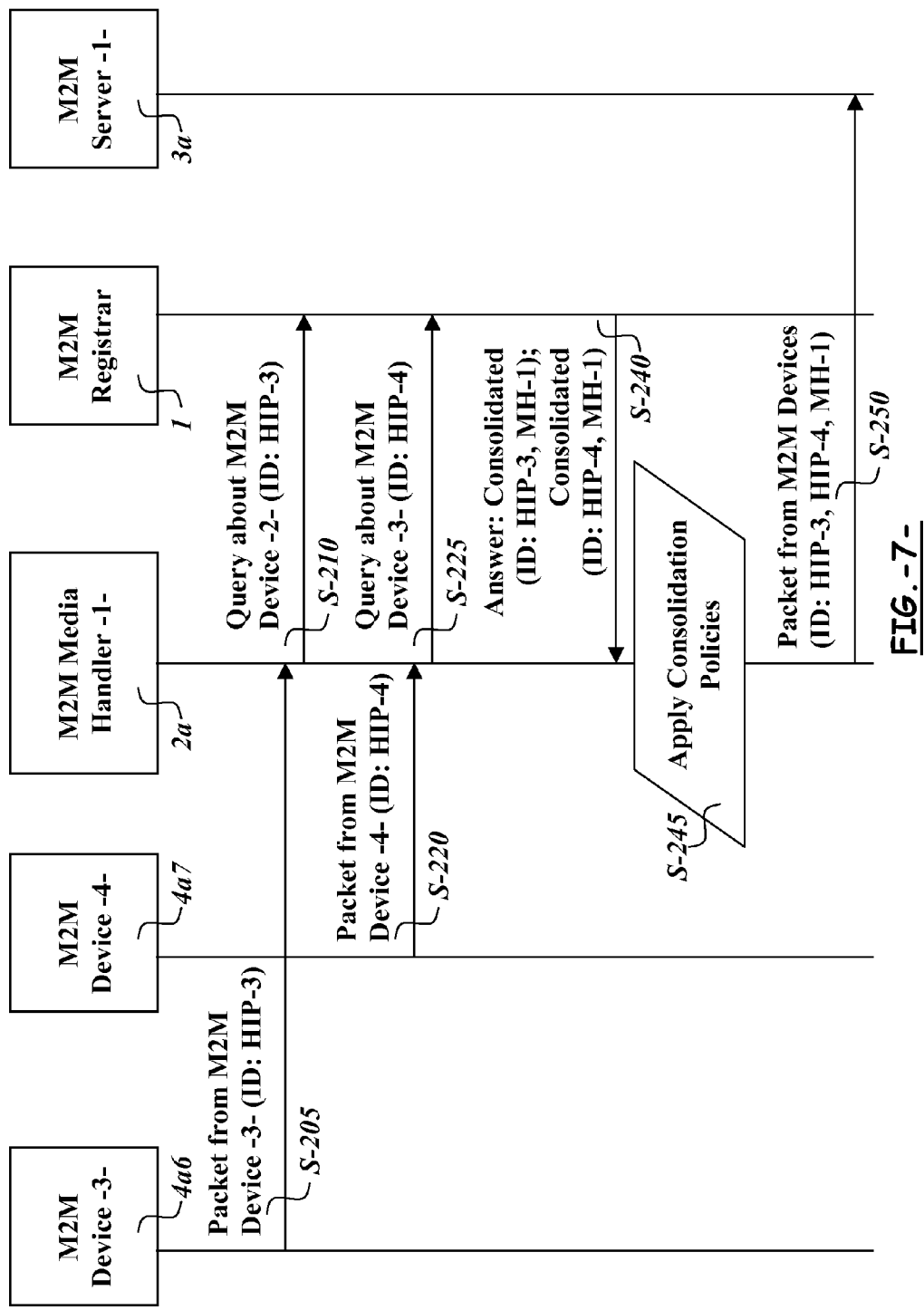
FIG.-7-

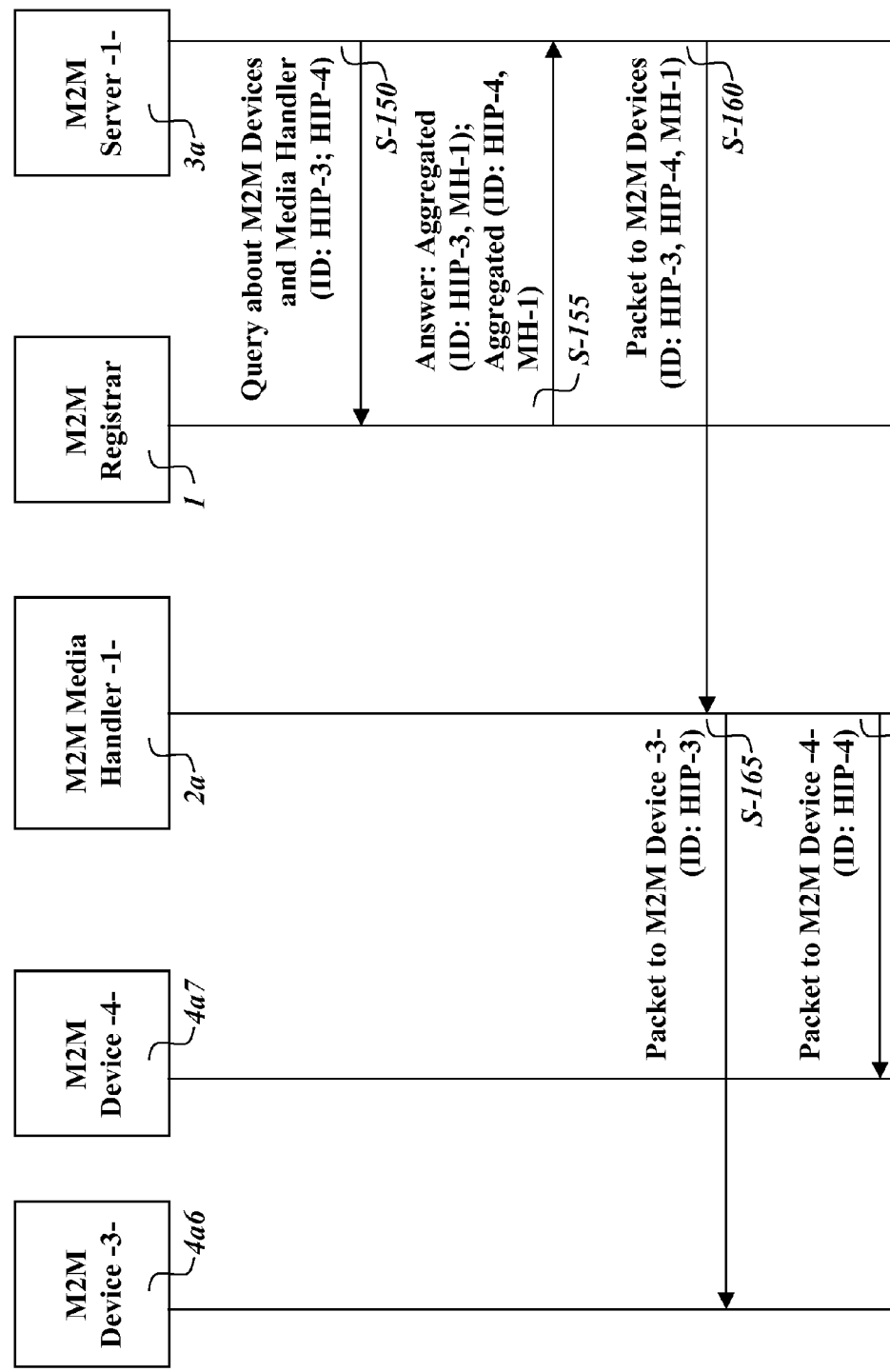
FIG. -8-

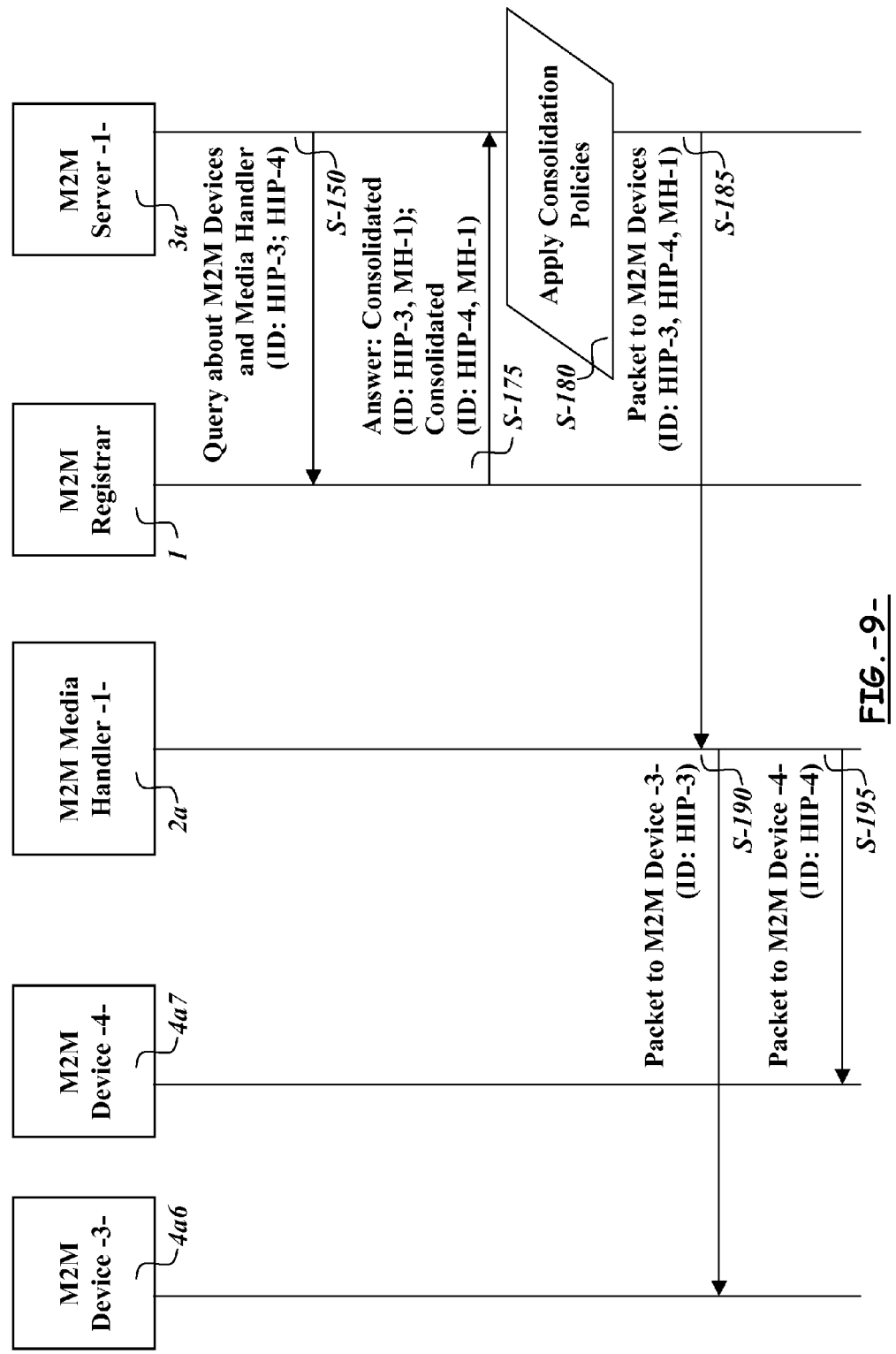
FIG. -9-

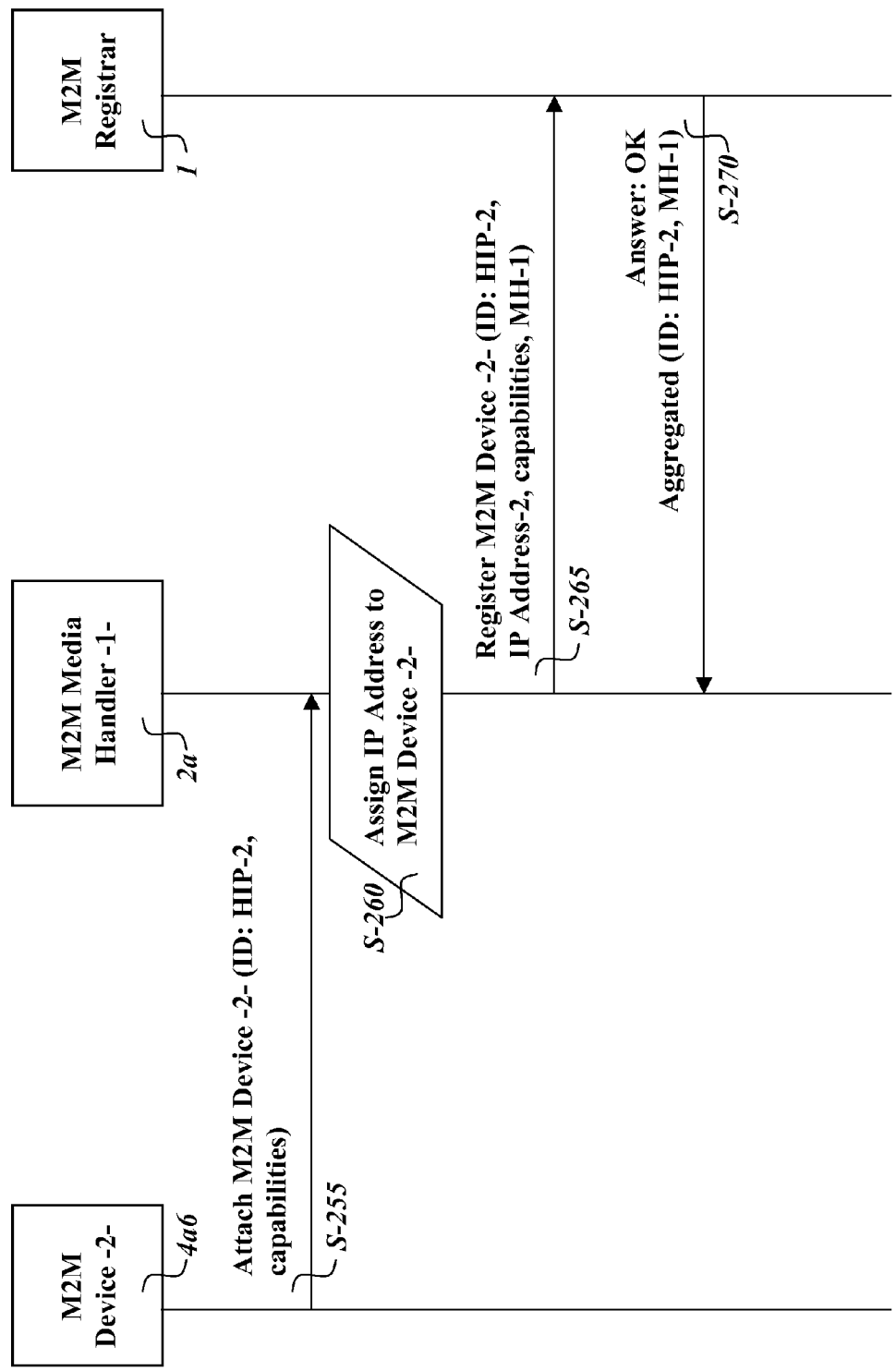
FIG. -10-

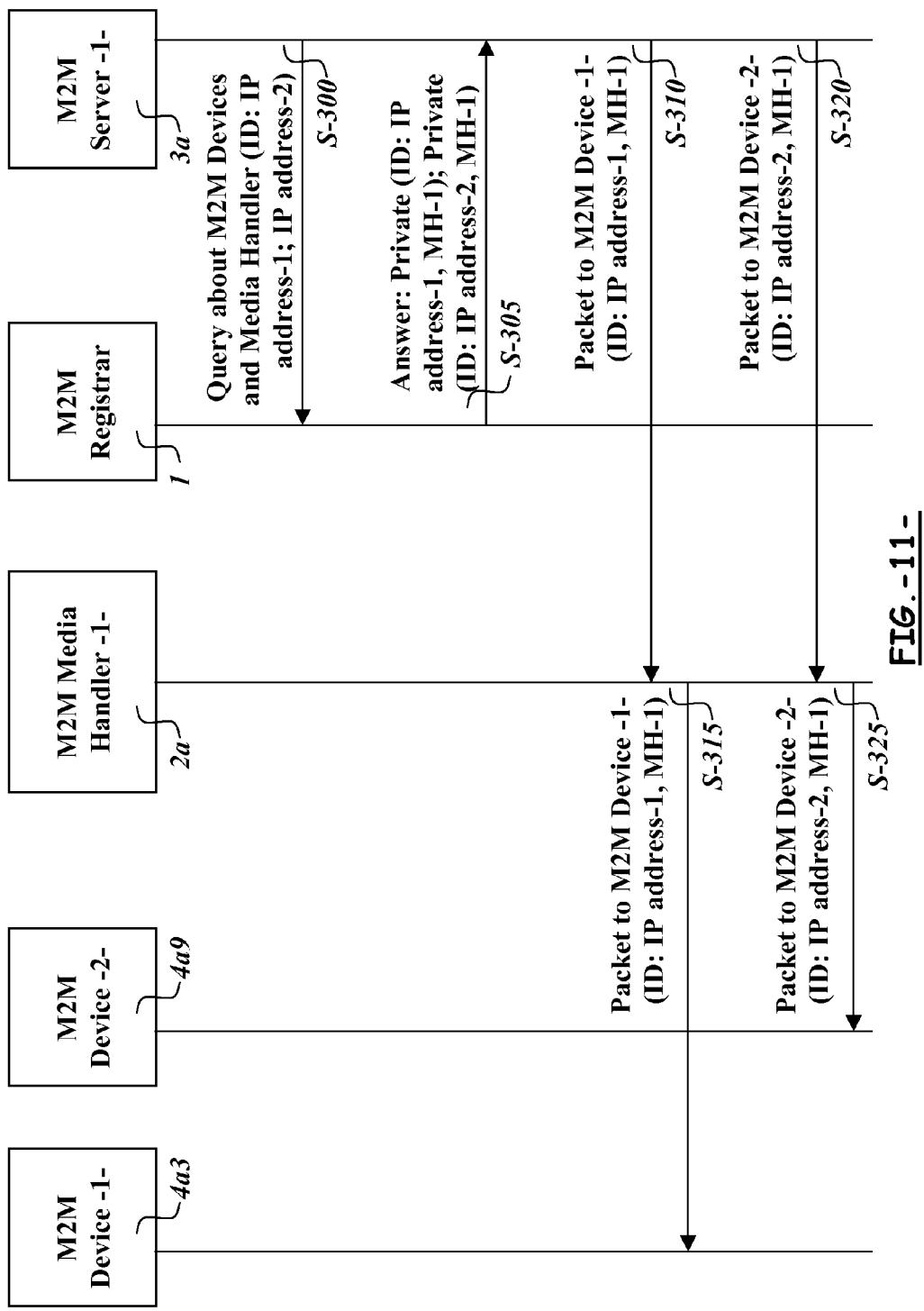
FIG. -11-

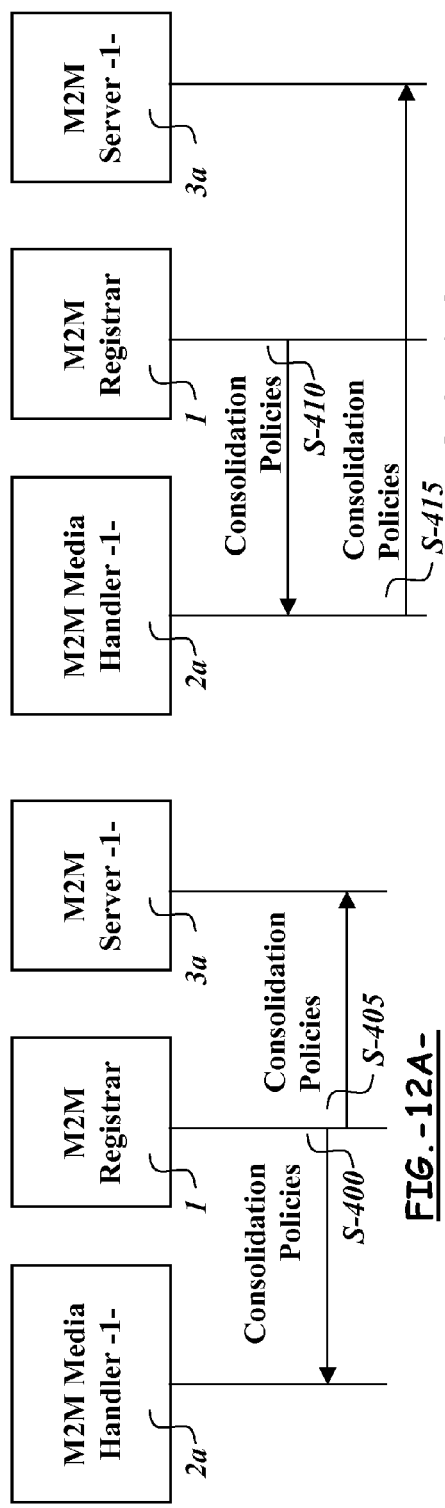
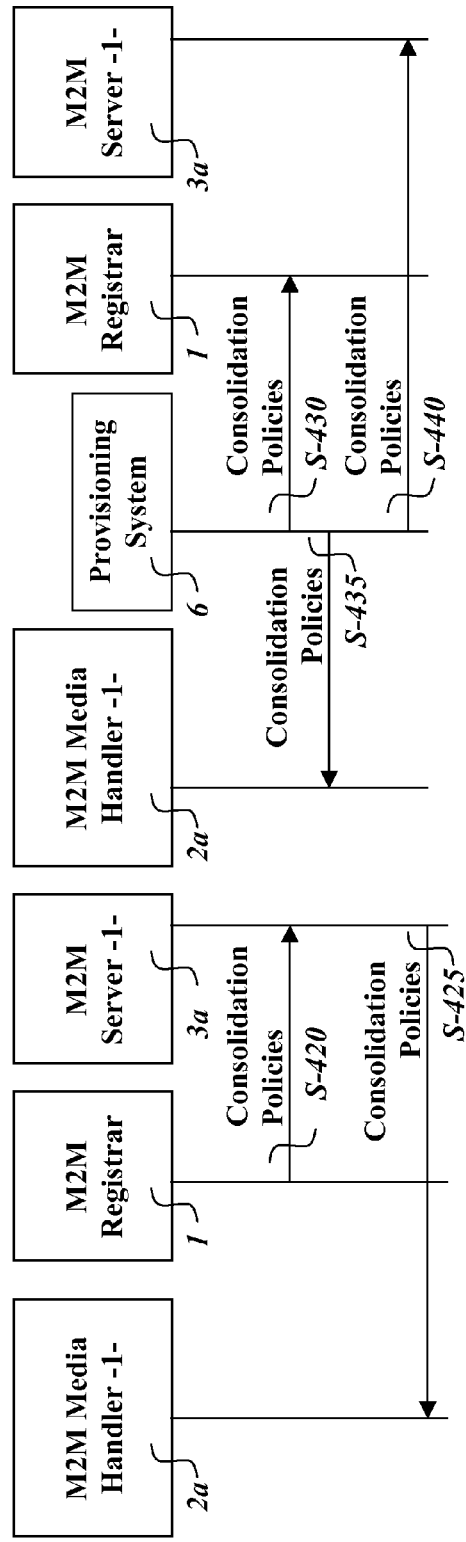
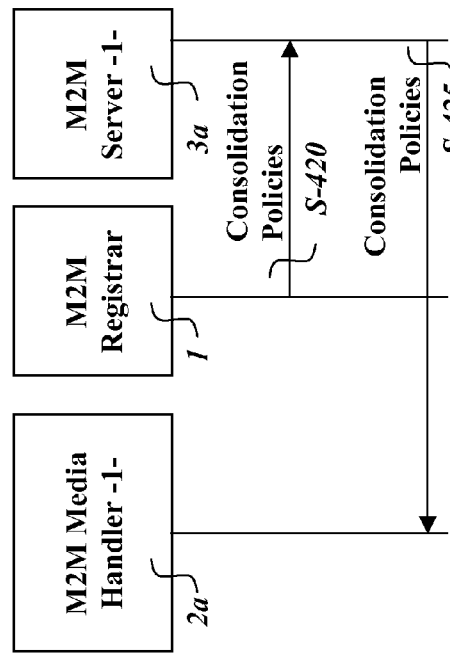

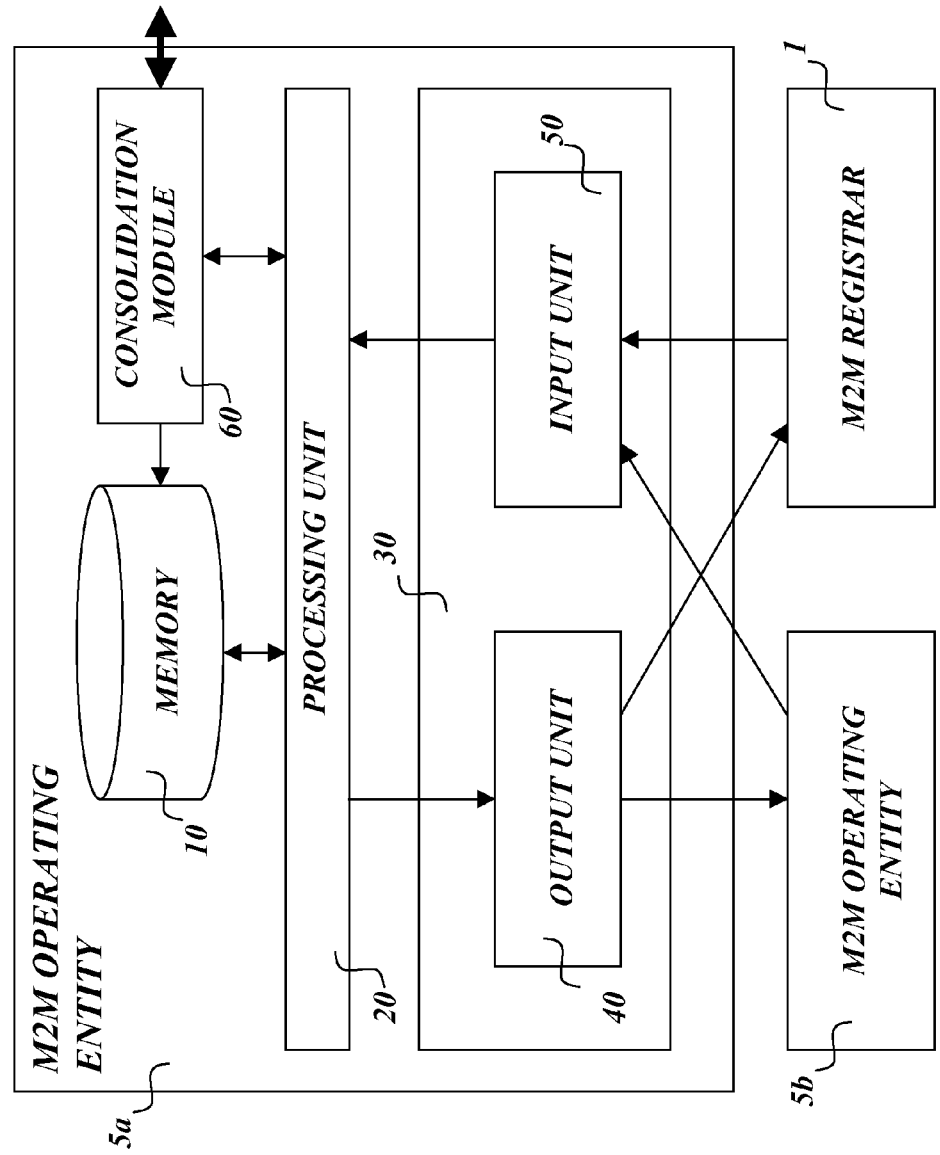
FIG. -13-

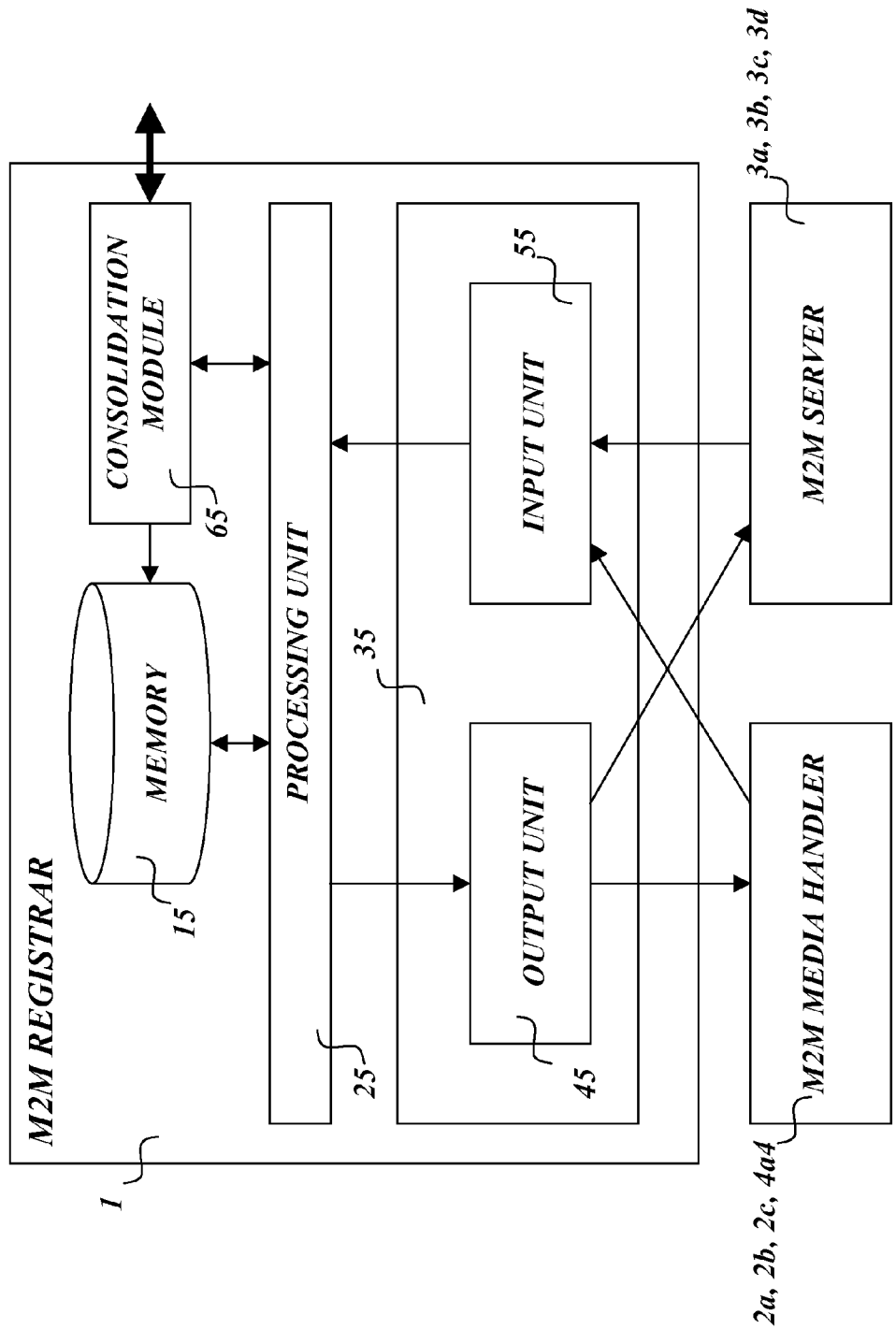
FIG. -14-

APPARATUSES AND METHODS FOR HANDLING MACHINE-TO-MACHINE COMMUNICATIONS

This application is the U.S. national phase of International Application No. PCT/EP2010/052113, filed 19 Feb. 2010, which designated the U.S., the entire contents of which is hereby incorporated by reference.

TECHNICAL FIELD

The present invention relates to the deployment of a Machine-To-Machine architecture and Machine-To-Machine communications over telecommunication networks. More specifically, the invention pertains to enhanced apparatuses and methods for handling Machine-To-Machine Devices and entities of the telecommunication networks with higher flexibility as well as with an easier and simpler remote control.

BACKGROUND

The so-called Machine-To-Machine (hereinafter M2M) is a further development of telecommunication networks whereby devices connected thereto, namely M2M Devices, are managed and instructed from dedicated servers, namely M2M Servers, through different routers and gateways, which are nowadays specialized entities in the M2M market.

An exemplary M2M system may be one comprising a so-called capillary network with a plurality of temperature sensors distributed amongst trees of a forest, a server connected to the capillarity network likely through a public telecommunication network, this server receiving temperature data from the sensors and processing them to determine whether any anomalous condition may be established, such as a fire, and likely connected with emergency systems.

Another exemplary M2M system may be one comprising a number 'n' of containers distributed in a number 'm' of trucks, where n>m and wherein each truck thus transports one or more containers, a server for tracking the current geo-position of each truck and, as assuming the server knows which container is in which truck, thus tracking the current geo-position of each container. Moreover, also in this exemplary M2M system, each container may be equipped with temperature sensors and controllers so that the server might influence the temperature of each container.

Many M2M systems already exist nowadays, likely including M2M Devices of very different nature and controlling functions of different types in each M2M Server.

The exponential grow of the M2M market, as quite a few analysts expect, implies for telecommunication network operators the expansion from millions of users to billions of M2M Devices. It is reasonably expected that the M2M market will cover a much wider spectrum beyond capillary networks of different type of sensors and the potential market derived thereof will increase even more.

At present, the M2M service providers and some telecommunication operators are currently developing value-added and end-to-end solutions for the M2M industry. Moreover, the current approaches consist of ad-hoc end-to-end solutions for specific vertical applications.

As already commented above, a basic M2M architecture includes a plurality of M2M Devices, in particular 'sensors', connected to each other following different patterns such as, for example, a ring-connection or a star-connection, and they all connected with a so-called M2M Gateway responsible for establishing a communication with a remote controller, namely an M2M Server, through a public network. In this situation, especially where referring to sensor networks, some of the communication patterns of M2M Devices make the direct connection towards public networks inefficient and costly.

In some cases, the number of M2M Devices required to provide an M2M service is very high and the information transmitted from and to each M2M Device is quite poor in volume and frequency. In other cases, the information is only relevant in relation with the information provided by other M2M Devices, so that the establishment of a specific communication channel towards public network cannot be efficient or justifiable from a cost perspective. The M2M service providers and operators developing end-to-end M2M solutions are thus facing some difficulties that preclude an easy and flexible deployment of M2M Devices. Currently, the M2M Device is tied to a specific capillarity network and to a specific M2M Gateway due to the configuration needed for correct inter-working.

The integration of M2M communications over public networks currently presents some limitations such as those exemplary disclosed in the following.

A first exemplary scenario illustrating the current limitations may be a fire-detection system in a forest, wherein one may assume that thousands of cheap temperature sensors, namely M2M Devices, are deployed on the forest and communicate with a supervision centre, namely an M2M Server, via one or more M2M Gateways. This deployment presents some drawbacks: first, the M2M Gateways and the M2M Server have to know each sensor before deployment; second, the communication between the M2M Devices and the M2M Server requires specific media streams; and third, most of the information flows used to provide the measured temperatures is not relevant for the fire-detection system.

A second exemplary scenario illustrating the current limitations may be a Logistic management with flexible trunks and containers. This deployment also presents some drawbacks: first, if the containers, namely M2M Devices, are wanted to establish an independent communication with a logistic control, namely M2M Server, the truck where each container is located may have an influence; second, the communication between the truck, the multiple containers transported therein, namely M2M Devices, and the M2M Server requires specific media streams; and third, some information such as the location, common for all the containers in the same truck is required to be handled independently per container basis.

Currently no specific support exists in public networks to optimize these scenarios. Particularly in some cases, the number of M2M Devices required to provide any M2M service is very high and the information transmitted for each M2M Device is very low in terms of volume and frequency. Also particularly in other cases, the information is only relevant in relation with information provided by other M2M Devices. In most of these cases, establishing a specific communication channel towards a public network cannot be efficient or justifiable from cost perspective. In summary, current public networks do not have mechanisms to optimize the transmission supported by M2M Devices connected thereto based on semantic information.

SUMMARY

The present invention is aimed to overcome, or at least to minimize, the above drawback and provides for an enhanced M2M architecture and associated mechanisms to allow, on the one hand, mobility management applicable to M2M Devices so that each M2M Device is not so closely bound to its corresponding M2M Gateway and can be more freely moved from an area controlled by a first M2M Gateway to an area controlled by a second M2M Gateway; and, on the other hand, aggregation of information streams generated by a plurality of M2M Devices using a unique communication channel through the public network towards one or more M2M Servers for remote control of the M2M Devices. Moreover, rather than necessary placing in the M2M Gateway corresponding new features disclosed by the present invention, there is provided a new entity, a so-called M2M Media Handler, to allocate these new features along with other existing M2M-related features so that conventional M2M Gateways may be kept as they are and associated with the new M2M Media Handler, or newer M2M Gateways may be implemented integrating such M2M Media Handler.

Irrespective of whether the M2M Media Handler is integrated into the M2M gateway, or simply connected thereto and in close cooperation with it, each M2M Device provided for in accordance with the present invention may thus perform a sort of location updating towards a centralized M2M Registrar through the M2M Media Handler, so that the M2M Registrar can unambiguously know where each M2M Device is located and operating, whereas the M2M Media Handler may thus distribute amongst the served M2M Devices aggregated information received from a remote M2M Server controlling the M2M Devices and, in fact, controlling M2M Media Handlers, as well as the M2M Server may thus collect information from the plurality of M2M Devices that can be aggregated for its transmission towards the telecommunication networks using different patterns.

In accordance with a first aspect of the present invention, there is provided a new method of handling subscription data for M2M Devices in a M2M system. This method comprises the steps of: provisioning a M2M Registrar with subscription data for a number of M2M Devices, wherein each M2M Device is assigned an M2M Device identifier, likely a profile with subscription data, and a first category indicator selected from: private, aggregated and consolidated; configuring the M2M Registrar with identifiers of one or more M2M Media Handlers in charge of handling M2M Devices, each M2M Media Handler being assigned a second category indicator selected from: private, aggregated and consolidated; registering one of more M2M Devices at the M2M Registrar, the registration of each M2M Device including the M2M Device identifier and an identifier of the M2M Media Handler in charge of handling the M2M Device; and answering a query about one or more M2M Device, query received at the M2M Registrar from at least one of: a M2M Media Handler and a M2M Server in charge of handling one or more M2M Media Handler, with a response indicating the identifier of the M2M Media Handler handling the M2M Device, and at least one of: the first category indicator which the M2M Device is assigned and the second category indicator which the M2M Media Handler is assigned.

Thus, the invention makes more flexible the association between the M2M Device and the M2M Media Handler than what the conventional M2M systems achieve between the M2M Devices and the M2M Gateway since, in accordance with this first aspect of the invention, one M2M Device is allowed to change between different M2M Media Handlers even serving different capillarity networks. Besides, in accordance with this first aspect of the invention, this method allows the discovery of M2M Devices connected to the network by establishing dynamic associations with the serving M2M Media Handlers.

Thanks to this aspect of the invention, the trucks in the above second exemplary scenario are allowed to act as M2M Media Handlers where the containers, namely M2M devices, are connected to; and the temperature sensors in the above first exemplary scenario can be connected to the M2M Media Handler that will make them accessible as needed without previous configuration and with support of the network.

Particularly useful in this method is that the query about one or more M2M Device may indicate a given M2M Media Handler identifier, so that the corresponding response may include identifiers of those M2M Devices served by a M2M Media Handler corresponding to the given M2M Media Handler identifier. In that way, a query about an M2M Media Handler, such as a truck in the above second exemplary scenario, may obtain a response about all the M2M Devices connected to the M2M Media Handler, that is, about all the containers transported by said truck.

In particular, the step of registering one of more M2M Device at the M2M Registrar may include a step of indicating the capabilities for each M2M Device. Irrespective of whether the step of registering the M2M Device includes or not the step of indicating the capabilities of the M2M Device, the step of registering in this method the one of more M2M Device at the M2M Registrar, may also include a step of downloading from the M2M Registrar towards the M2M Media Handler the first category indicator assigned to the one or more M2M Device.

This method of handling subscription data for M2M Devices in a M2M system may further comprise a step of answering a query received at the M2M Registrar from a M2M Server, the query indicating a given M2M Media Handler identifier, with a response including at least one of: capabilities and second category indicator of a M2M Media Handler corresponding to the given M2M Media Handler identifier.

In accordance with a second aspect of the present invention, there is provided a new method of handling operation data of M2M Devices in a M2M system. This method comprises the steps of: obtaining in at least one of a M2M Media Handler and a M2M Server, wherein the M2M Media Handler is in charge of handling M2M Devices and the M2M Server is in charge of handling M2M Media Handlers, consolidation policies to be respectively applied per each other basis; querying a M2M Registrar from at least one of the M2M Media Handler and the M2M Server about one or more M2M Device; receiving at the at least one of the M2M Media Handler and the M2M Server from the M2M Registrar information about the one or more M2M Device indicating for each M2M Device the identifier of the M2M Media Handler handling the M2M Device, and at least one of: a first category indicator which the M2M Device is assigned and a second category indicator which the M2M Media Handler is assigned, wherein first and second category indicator values are selected from: private, aggregated and consolidated.

This method, depending on the first, the second, or both category indicators received in at least one of the M2M Media Handler and the M2M Server, further comprises a step of exchanging information between the M2M Media Handler and the M2M Server by using an individual communication session for each one of the one or more M2M Device, where the received first category indicator, second category indicator, or both indicate private; or a step of exchanging information between the M2M Media Handler and the M2M Server by using a communication session for all M2M Devices, where the received first category indicator, second category indicator, or both indicate aggregated; or a step of exchanging information between the M2M Media Handler and the M2M Server by using a communication session for those M2M devices where the received first category indicator, second category indicator, or both indicate consolidated, the communication session including information consolidated according to applicable consolidation policies.

Thus, the invention provides for collecting information from the M2M Devices that can be aggregated for its transmission towards the telecommunication network using different patterns. Thanks to this second aspect of the invention, all the communications from/to different containers, namely M2M Devices, can be aggregated by the M2M Media Handler installed in the truck of the above second exemplary scenario. This allows providing the containers with currently so-called 'next field communication' (hereinafter NFC) capabilities. In addition the communication through the public network can be aggregated minimizing the related cost. Likewise, the temperature sensors of the above first exemplary scenario can communicate via the M2M Media Handler by using only NFC capabilities and minimizing the communications established through public network. Moreover, the invention thus provides for mechanisms to aggregate information from multiple M2M Devices at semantic level, that is, accordingly with the specific meaning of the information. The M2M Media Handler can logically process and aggregate the information. Therefore, also thanks to this second aspect of the invention, the temperature sensors of the above first exemplary scenario can communicate with a supervision centre, namely an M2M Server, only when some high temperature focuses are identified. Furthermore, the invention thus allows the assignation to M2M Devices of a new category based on the media handling and with types: private, aggregated or consolidated.

Advantageously in this method of handling operation data of M2M Devices in a M2M system, the consolidation policies allow consolidation of one or more type of information transmissible by the one or more M2M Device by applying one or more function to said one or more type of information in order to determine whether the consolidated information is communicated by a unique communication session or by more than one communication session. In particular, the one or more function may be selected from: mathematical, statistical, thermo-dynamical, chemical, mechanical, positional, physiological, logical and social functions as well as combinations thereof.

One may think in a number of physiological and chemical functions applying to the type of information transmitted by a number of sensors, namely M2M Devices located in a human body, in order to determine whether a unique communication session is to be transmitted to one medical centre, namely one M2M Server, or more than one communication sessions are to be transmitted to different health centres such as a doctor's office and a laboratory, namely more than one M2M Servers.

Particularly advantageous in connection with the above method of handling subscription data for M2M Devices in accordance with the first aspect of the invention, this method of handling operation data of M2M Devices may further include a step of receiving at the M2M Media Handler an attach message for each M2M Device connected with the M2M Media Handler; and, responsive to each attach message, a step of registering the corresponding M2M Device towards a M2M Registrar, the registration of each M2M Device including the M2M Device identifier and an identifier of the M2M Media Handler.

Regarding the exchange of information between the M2M Media Handler and the M2M Server, in an embodiment of the invention the step of exchanging information between the M2M Media Handler and the M2M Server may further comprise a step of collecting at the M2M Media Handler information from the M2M Devices connected thereto. Alternatively or complementary to this embodiment, in another embodiment of the invention the step of exchanging information between the M2M Media Handler and the M2M Server includes the steps of: receiving the one or more communication sessions at the M2M Media Handler, determining whether any of these communication sessions aggregates or consolidates information for more than one M2M Device, extracting from the aggregated, the consolidated, or both communication sessions individual information per M2M Device basis, and transmitting individual communication sessions corresponding to the one or more communication sessions received from the M2M Server towards the one or more M2M Device connected to the M2M Media Handler.

The applicability of the two above cooperating methods requires new or enhanced M2M entities to carry out the corresponding method steps. Particularly, some method steps are performed by one of these M2M entities alone whereas other method steps require the cooperation of more than one M2M entity. For the purpose of the present invention, these M2M entities are the so-called M2M Registrar and a so-called M2M operating entity; the former being used for handling subscription data of M2M Devices in a M2M system, and the latter being enabled to act as a M2M Media Handler in charge of handling one or more M2M Device, or as a M2M Server in charge of handling one or more M2M Media Handlers in a M2M system.

Thus, in accordance with a third aspect of the invention, there is provided a M2M Registrar comprising: a configuration module cooperating with a storage for being provisioned with subscription for a number of M2M Devices, wherein each M2M Device is assigned an M2M Device identifier, a first category indicator selected from: private, aggregated and consolidated, and likely a service profile with subscription data; and for being configured with identifiers of one or more M2M Media Handler in charge of handling M2M Devices, wherein each M2M Media Handler is assigned a second category indicator selected from: private, aggregated and consolidated.

This M2M Registrar also comprises a processing unit in cooperation with an input unit for receiving a registration for one of more M2M Devices, the registration of each M2M Device including the M2M Device identifier and an identifier of the M2M Media Handler in charge of handling the M2M Device; and the processing unit in cooperation with the storage and with an output unit for answering a query about one or more M2M Device, query received at the M2M Registrar from at least one of: a M2M Media Handler and a M2M Server in charge of handling one or more M2M Media Handler, with a response indicating the identifier of the M2M Media Handler handling the M2M Device, and at least one of: the first category indicator which the M2M Device is assigned and the second category indicator which the M2M Media Handler is assigned.

In order to carry out the advantages disclosed above with regard to the method of handling subscription data, different alternative or complementary embodiments are proposed for this M2M Registrar, as further described.

In accordance with a fourth aspect of the invention, as commented above, there is provided an M2M operating entity for acting as a M2M Media Handler in charge of handling one or more M2M Devices, or as a M2M Server in charge of handling one or more M2M Media Handlers in a M2M system. This M2M operating entity includes a consolidation module for receiving consolidation policies, the consolidation policies to be applied per M2M Media Handler basis, where the operating entity acts as a M2M Server, or the consolidation policies to be applied per M2M Server basis, where the operating entity acts as a M2M Media Handler; and a first storage for storing said consolidation policies. In this respect, this first storage may be an integral part of the consolidation module or a separate storage entity combinable with other storage units in the M2M operating entity.

The M2M operating entity also includes a processing unit in cooperation with an output unit for querying a M2M Registrar about one or more M2M Device; the processing unit in cooperation with an input unit for receiving from the M2M Registrar information about the one or more M2M Device indicating for each M2M Device the identifier of the M2M Media Handler handling the M2M Device, and at least one of: a first category indicator which the M2M Device is assigned and a second category indicator which the M2M Media Handler is assigned, wherein first and second category indicator values are selected from: private, aggregated and consolidated; and a second storage for storing said information received from the M2M Registrar. In this respect, this second storage may be combined with the above first storage as a unique storage, within or outside the consolidation module, or the second storage may be a separate storage entity in the M2M operating entity.

In this M2M operating entity suitable for acting as a M2M Media Handler or as a M2M Server, the processing unit in cooperation with the input unit, the output unit, or with both, is arranged for exchanging information with another M2M operating entity by using, depending on the first, the second, or both received category indicators: an individual communication session for each one of the one or more M2M Device, where the received first category indicator, second category indicator, or both indicate private; or a communication session for all M2M Devices, where the received first category indicator, second category indicator, or both indicate aggregated; or a communication session for those M2M devices where the received first category indicator, second category indicator, or both indicate consolidated, the communication session including information consolidated according to applicable consolidation policies.

In order to carry out the advantages disclosed above with regard to the method of handling operation data, different alternative or complementary embodiments are proposed for this M2M operating entity and further disclosed in detail.

On the other hand, the invention may be practised by a computer program, in accordance with a fifth aspect of the invention, the computer program being loadable into an internal memory of a computer with input and output units as well as with a processing unit, and comprising executable code adapted to carry out the above method steps for at least one of both methods. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 illustrates a first exemplary M2M architecture with a M2M Registrar, a first M2M Server connected with a first M2M Media Handler handling one capillary network, a second M2M Server connected with a second M2M Media Handler and a third M2M Media Handler, wherein the second M2M Media Handler handles two capillary networks and the third M2M Media Handler handles just one capillary network which may be switched in order to be controlled by the second M2M Media Handler.

FIG. 2 illustrates a second exemplary M2M architecture with a M2M Registrar, two M2M Servers connected with a M2M Media Handler handling two capillary networks, wherein a M2M Server communicates with M2M Devices in a capillary network with private sessions, whereas the other M2M Server communicates with M2M Devices in the other capillary network with aggregated or consolidated sessions.

FIG. 3 illustrates a third exemplary M2M architecture with a M2M Registrar, two M2M Servers connected with a M2M Media Handler handling one capillary network, wherein one M2M Server communicates with some M2M Devices in the capillary network with private sessions, whereas the other M2M Server communicates with the other M2M Devices in the capillary network with aggregated sessions.

FIG. 4 illustrates a fourth exemplary M2M architecture with a M2M Registrar, a M2M Server connected with a M2M Media Handler handling one capillary network, wherein the M2M Server communicates with some M2M Devices in the capillary network with private sessions, and communicates with the other M2M Devices in the capillary network with aggregated sessions. Moreover, the M2M Server communicates with a particular M2M device in the capillary network with a private session, and this particular M2M Device acts in the capillary network as a second M2M Media Handler handling three M2M Devices and considering the received private session as an aggregated session to be submitted to the three M2M Devices as private sessions.

FIG. 5 illustrates a simplified view of the sequence of actions to be performed when M2M Devices initiate communications to be transmitted between a M2M Media Handler and a M2M Server as private individual sessions.

FIG. 6 illustrates a simplified view of the sequence of actions to be performed when M2M Devices initiate communications to be transmitted between a M2M Media Handler and a M2M Server as an aggregated session.

FIG. 7 illustrates a simplified view of the sequence of actions to be performed when M2M Devices initiate communications to be transmitted between a M2M Media Handler and a M2M Server as a consolidated session.

FIG. 8 illustrates a simplified view of the sequence of actions to be performed when a M2M Server initiates communications towards M2M Devices to be transmitted though a M2M Media Handler as an aggregated session.

FIG. 9 illustrates a simplified view of the sequence of actions to be performed when a M2M Server initiates communications towards M2M Devices to be transmitted though a M2M Media Handler as a consolidated session.

FIG. 10 illustrates an exemplary sequence of actions to be carried out when a M2M Device attaches to a telecommunication network through a M2M Media Handler which registers the M2M Device in a M2M Registrar.

FIG. 11 illustrates a simplified view of the sequence of actions to be performed when a M2M Server initiates communications towards M2M Devices to be transmitted though a M2M Media Handler as private individual sessions.

FIG. 12A-12D illustrate exemplary alternative embodiments on how the M2M Media Handler and the M2M Server might obtain consolidation policies.

FIG. 13 shows basic structural elements that a M2M operating entity, such as the M2M Media Handler and the M2M Server, may include.

FIG. 14 shows basic structural elements that a M2M Registrar may include.

DETAILED DESCRIPTION

The following describes currently preferred embodiments of an enhanced M2M architecture and associated mechanisms to allow a more flexible mobility management of M2M Devices in different capillary networks, by dynamically binding said the M2M Devices with different M2M Media Handlers connected with, or integrated in, existing M2M Gateways, as well as to allow aggregation and consolidation of information streams generated by the M2M Devices, by using a unique communication channel between one or more M2M Servers and the different M2M Media Handlers, for traffic with origin or destination in the M2M Devices, through the public network. In particular, these mechanisms in the enhanced M2M architecture include the new method of handling subscription data for M2M Devices in a M2M system and the new method of handling operation data of M2M Devices in a M2M system, both further described in the light of the illustrating drawings.

Different network scenarios, with different or same nature of capillary networks may be built up in accordance with the invention; wherein a same M2M Media Handler, such as the second M2M Media Handler 2b in FIG. 2, may be connected with more than one capillary network, such as third and fifth capillary networks 4c and 4e in FIG. 2, and with more than one M2M Server, such as second and third M2M Servers 3b and 3c; wherein any particular capillary network, such as the fourth capillary network 4d in FIG. 1, may be detached from one particular M2M Media Handler, such as the second M2M Media Handler 2b in FIG. 1, and attached with a new M2M Media Handler, such as the third M2M Media Handler 2c in FIG. 1; wherein some M2M Devices in a capillary network, such as the fifth capillary network 4e in FIG. 3, may be controlled from a M2M Server, such as the third M2M Server 3c in FIG. 3, some other M2M Devices in the same capillary network may be controlled from another M2M Server, such as the fourth M2M Server 3d in FIG. 3, and all the M2M Devices communicating with respective M2M Server through a same M2M Media Handler, such as the second M2M Media Handler 2b in FIG. 3; or wherein some M2M Devices in a capillary network, such as M2M Devices 4a6, 4a7,4a8 of the first capillary network 4a in FIG. 4, may communicate in aggregated mode with a M2M Server, such as the first M2M Server 3a in FIG. 4, through a M2M Media Handler, such as the first M2M Media Handler 2a in FIG. 4, and some other M2M Devices in the capillary network, such as M2M Devices 4a3,4a-4, 4a9 of the first capillary network 4a in FIG. 4, may communicate in private mode with the M2M Server through the M2M Media Handler. Particularly, the FIG. 4 shows a scenario wherein a M2M Device 4a-4 in the first capillary network 4a behaves, in fact, as a M2M Media Handler and is adapted for receiving communications from the M2M Media Handler 2a as if it were a M2M Devices and for further distributing corresponding communications to other M2M Devices, such as M2M Devices 4a1, 4a2, 4a5 of the capillary network 4a.

Different scenarios like the ones above, and many different combinations may appear in each scenario whereby some M2M Devices may be communicated with the M2M Server through the M2M Media Handler with private sessions, others with aggregate sessions and still others with consolidated sessions.

Prior to discussing different embodiments on the handling of private, aggregated and consolidated sessions, a possible embodiment of registration of M2M Devices is worth to be discussed with reference to FIG. 10.

As illustrated in FIG. 10, a M2M Device 4a6 aware of the M2M Media Handler 2a may submit an attach message during a step S-255 to the M2M Media Handler including an identifier of the M2M Device and, optionally, its own capabilities. The M2M Media Handler receiving the attach message may assign an IP address to the M2M Device during a step S-260, and the M2M Media Handler submits a register message during a step S-265 to a M2M Registrar 1 in charge of subscription data for the M2M Device. This register message includes the M2M Device identifier and an own identifier identifying the M2M Media Handler currently handling the M2M Device. Besides, the register message may also include the IP address assigned by the M2M Media Handler to the M2M Device for further identification purposes, as well as the M2M Device capabilities, if provided by the M2M Device.

In an embodiment of the invention, as provisioning the M2M Registrar with subscription data for a number of M2M Devices, capabilities for one or more M2M Device may also be provided, capabilities which may be selected from: one or more physical characteristic sensor, location, configuration parameters, and combinations thereof. Where this embodiment is practised in the M2M Registrar, queries about such M2M Devices may additionally be answered with such capabilities provisioned in the M2M Registrar.

Alternatively or complementary to the above embodiment, a similar achievement may be obtained where the step of registering one of more M2M Device at the M2M Registrar includes a step of indicating the capabilities for each M2M Device, capabilities which, as above, may be selected from: one or more physical characteristic sensor, location, configuration parameters, and combinations thereof.

Moreover, the embodiment of provisioning M2M Device capabilities at the M2M Registrar and the embodiment of providing said capabilities from the M2M Device itself during registration are not exclusive to each other since different versions or generations of M2M Devices may coexist in the market so that some M2M Devices may provide its own capabilities whereas others are not capable of doing it and need the provision of M2M Device capabilities by provisioning means.

Once the M2M Device 4a6 has been registered in the M2M Registrar 1, the latter confirms the registration back to the M2M Media Handler 2a during a step S-270. This confirmation of having registered the M2M Device may optionally include a first category indicator assigned to the M2M Device at the M2M Registrar, and also optionally a second category indicator assigned to the M2M Media Handler at the M2M Registrar. These first and second category indicators may indicate whether private, aggregated or consolidated sessions are respectively supported by the M2M Device and the M2M Media Handler.

Regarding different embodiments on the handling of private, aggregated and consolidated sessions depending on the different scenarios exemplary illustrated in FIG. 1 to FIG. 4, the FIG. 5 illustrates the sequence of actions to be followed where communication packets are sent from a number of M2M Devices though a M2M Media Handler in a telecommunication network towards a M2M Server. As exemplary illustrated in FIG. 5 a first communication packet may be submitted from a first M2M Device 4a3 in this drawing during a step S-105 towards a M2M Media Handler 2a wherein the M2M Device had previously attached, and registered through in a M2M Registrar 1 as exemplary illustrated in FIG. 10 and explained above. The M2M Media Handler receiving the communication packet queries during a step S-110 the M2M Registrar 1 about the M2M Device identified by an identifier included by the sender M2M Device, which in particular might be an IP address assigned during the exemplary embodiment illustrated in FIG. 4.

In parallel with this above sequence of actions, a second M2M Device 4a9 in this drawing may submit a second communication packet to the M2M Media Handler 2a during a step S-115, for which the M2M Media Handler also queries the M2M Registrar 1 during a step S-125 about the M2M Device identified by an identifier included by the sender M2M Device, which in particular might be an IP address assigned during the exemplary embodiment illustrated in FIG. 4, or an identifier of another nature as further commented in the light of other embodiments. During this process related to the second communication packet, or after having concluded the above actions, the M2M Registrar 1 may answer the query about the first communication packet during a step S-120 informing that the first M2M Device is assigned a first category indicator indicating private communication session to be used for communications with the M2M Server. Further, the M2M Media Handler 2a may further receive during a step S-130 from the M2M Registrar 1 as answer to the query a first category indicator for the second M2M Device also indicating private communication session to be used for communications with the M2M Server.

Then, taking into account the first category indicator received for each M2M Device, as well as a second category indicator indicating its own capacity to handle private, aggregated or consolidated communication sessions, which may be configured in the M2M Media Handler or received from the M2M Registrar, the M2M Media Handler submits during a step S-135 a private or individual communication session for the first M2M Device 4a3, and another private or individual communication session during a step S-140 for the second M2M Device 4a9 towards the M2M Server 3a.

FIG. 6 illustrates another embodiment of the invention with a sequence of actions to be followed where communication packets are sent from a number of M2M Devices though a M2M Media Handler in a telecommunication network towards a M2M Server. As exemplary illustrated in FIG. 6 a first communication packet may be submitted from a third M2M Device 4a6 during a step S-205 and a second communication packet may be submitted from a fourth M2M Device 4a7 during a step S-220 towards a M2M Media Handler 2a wherein both M2M Devices had previously registered through in the M2M Registrar 1.

The M2M Media Handler, upon receiving the first and second communication packets, respectively queries during respective steps S-210 and S-225 the M2M Registrar 1 about each M2M Device identified by an identifier included by the sender M2M Device, which in particular might be a host identifier (hereinafter HIP). As for the previous embodiment explained with reference to FIG. 5, this embodiment shown in FIG. 6 also provides for the M2M Registrar respectively answering during steps S-215 and S-230 each respective query, each answer informing the first category indicator that each M2M Device is assigned. Thus, the M2M Media Handler is informed during the steps S-215 and S-230 that the third M2M Device 4a6 and the fourth M2M Device 4a7 require an aggregated communication session to be used for communications with the M2M Server.

Then, taking into account the first category indicator received for each M2M Device, as well as the second category indicator known to the M2M Media Handler and indicating its own capacity to handle private, aggregated or consolidated communication sessions, the M2M Media Handler submits during a step S-235 an aggregated communication session for both third M2M Device 4a6 and fourth M2M Device 4a7 towards the M2M Server 3a.

The category indicator assigned to any M2M Device in the M2M Registrar may be changed at any time by provisioning a different value than the one previously assigned. Apart from this, a M2M Registrar may be configured to always provide an individual answer for each individual query received from M2M Media Handler or from a M2M Server, which is specially interesting where all individual category indicators of a number of M2M Devices are set to 'private'; or may be configured to delay each individual answer until a plurality of queries are received that can be answered with a unique response for the plurality of queries, which is specially advantageous where all individual category indicators of a number of M2M Devices are set to 'aggregated' or 'consolidated'.

In this respect, FIG. 7 shows a similar scenario as the one in FIG. 6, namely the third M2M Device 4a6 and fourth M2M Device 4a7 submitting communication packets to the M2M Media Handler 2a, querying the M2M Registrar 1 and eventually submitting a communication session to the M2M Server. However, in this scenario the category indicator of both M2M Devices had changed in respect of the scenario shown in FIG. 6.

As exemplary illustrated in FIG. 7 a first communication packet is submitted from the third M2M Device 4a6 during a step S-205 and a second communication packet is submitted from the fourth M2M Device 4a7 during a step S-220 towards the M2M Media Handler 2a wherein both M2M Devices had previously registered through in the M2M Registrar 1. The M2M Media Handler, upon receiving the first and second communication packets, respectively queries during respective steps S-210 and S-225 the M2M Registrar 1 about each M2M Device identified by the identifier included by the sender M2M Device, which in particular might be a HIP as for the scenario shown in FIG. 6.

Under the embodiment illustrated in FIG. 7, the M2M Registrar 1 may answer these queries about first and second M2M Devices 4a6 and 4a7 with a unique answer message during a step S-240 indicating the respective first category indicator for each M2M Device, which in this case is 'consolidated'. The M2M Media Handler 2a receiving such first category indicators applies during a step S-245 consolidation policies previously obtained, and further described, to the communication packets and determines that a unique communication session will carry both communication packets towards the M2M Server. Eventually, the M2M Media Handler submits the consolidated communication session during a step S-250 towards the M2M Server 3a.

As already commented above, the consolidation policies allow consolidation of one or more type of information transmissible by the one or more M2M Device by applying one or more function to said one or more type of information in order to determine whether the consolidated information is communicated by a unique communication session or by more than one communication session. In particular, the one or more function may be selected from: mathematical, statistical, thermo-dynamical, chemical, mechanical, positional, physiological, logical and social functions as well as combinations thereof.

Regarding the manner of obtaining consolidation policies in this method, different embodiments are provided for depending on the entity obtaining such consolidation policies. For instance, the step of obtaining consolidation policies at the M2M Server may include at least one step selected from: configuring the consolidation policies at the M2M Server, retrieving the consolidation policies from the M2M Registrar and retrieving the consolidation policies from the M2M Media Handler; whereas the step of obtaining consolidation policies at the M2M Media Handler may include at least one step selected from: configuring the consolidation policies at the M2M Media Handler, retrieving the consolidation policies from the M2M Registrar and retrieving the consolidation policies from the M2M Server. In this respect, exemplary embodiments illustrate in FIG. 12A to FIG. 12D how different entities may obtain consolidation policies.

Thus, in a first embodiment illustrated in FIG. 12A, the M2M Registrar 1 may respectively provide consolidation policies to the M2M Media Handler 2a and to the M2M Server 3a during respective steps S-400 and S-405. The M2M Registrar might have been configured with these consolidation policies or might have been further provisioned with them from a provisioning system, what is not illustrated in this drawing.

A first alternative embodiment to the previous one is illustrated in FIG. 12B wherein the M2M Registrar 1 may provide all consolidation policies to the M2M Media Handler 2a during a step S-410, and wherein the latter may keep its own applicable consolidation policies and may provide to the M2M Server 3a during a step S-415 those consolidation policies applicable to said M2M Server. The M2M Registrar might have been configured with these consolidation policies or might have been further provisioned with them from a provisioning system.

A second alternative embodiment to the above one is illustrated in FIG. 12C wherein the M2M Registrar 1 may provide all consolidation policies to the M2M Server 3a during a step S-420, and wherein the latter may keep its own applicable consolidation policies and may provide to the M2M Media Handler 2a during a step S-425 those consolidation policies applicable to said M2M Media Handler. The M2M Registrar might have been configured with these consolidation policies or might have been further provisioned with them from a provisioning system.

An exemplary fourth embodiment in respect of obtaining consolidation policies by M2M entities is illustrated in FIG. 12D, wherein a provisioning system 6 respectively provides consolidation policies to the M2M Registrar 1 during a step S-430, to the M2M Media Handler 2a during a step S-435, and to the M2M Server 3a during a step S-440.

In view of these embodiments illustrated in FIG. 12A to 12D, one may conclude that other feasible embodiments not illustrated in any drawing may be derived thereof. For instance, the consolidation policies may be configured, or even provisioned by the provisioning system, on the M2M Media Handler or on the M2M Server and then transferred from the latter towards the M2M Registrar in order to be accessible therein for other entities. Moreover, different consolidation policies may be obtained at the M2M Media Handler and M2M Server, so that the M2M Registrar may further compile them to offer final policies to the parties.

Back to the sequence of actions to exchange information between the M2M Media Handler and the M2M Server, and apart from the above embodiments where the M2M Media Handler initiates the submission of communication sessions towards the M2M Server, the exchange of information between the M2M Media Handler and the M2M Server may be initiated by the M2M Server as well.

For instance, as illustrated in FIG. 8, a M2M server 3a wanting to submit orders, commands or queries to M2M Devices, such as the exemplary third and fourth M2M Devices 4a6 and 4a7 might be, may first of all query the M2M Registrar 1 during a step S-150 about such M2M Devices.

Where a unique query is received at the M2M Registrar asking about more than one M2M Device, a unique answer is preferably returned by the M2M Registrar during a step S-155 indicating the first category indicator for each M2M Device in the query. As already commented above, the M2M Registrar may be configured to preferably answer each query in the same mode as received, namely on individual basis or on a plurality basis; although the M2M Registrar may also be configured to group a number of queries received in a certain time gap with q unique answer.

The M2M Server 3a receiving in this case first category indicators indicating that the third and fourth M2M Devices require aggregated communication sessions, prepares and submits during a step S-160 a unique aggregated communication session for said third and fourth M2M Devices towards the M2M Media Handler 2a. The M2M Media Handler 2a receiving the aggregated communication session extracts the individual information per M2M Device, prepares corresponding communication packets, and respectively submits the individual communication packets to the third and fourth M2M Devices 4a6 and 4a7 during respective steps S-165 and S-170.

As already commented above in respect of the embodiments referring the exchange of information initiated from the M2M Media Handler, the category indicator assigned to any M2M Device in the M2M Registrar may be changed at any time by provisioning a different value as category indicator than the one previously assigned.

Thus, FIG. 9 illustrates a similar scenario to the one shown in FIG. 8, but where the category indicator for the M2M Devices has been previously changed to 'consolidated'. As illustrated in FIG. 9, the query submitted during the step S-150 from the M2M Server 3a towards the M2M Registrar 1, querying about the third and fourth M2M Devices, may be answered from the M2M Registrar with a unique answer message during a step S-175 indicating that both M2M Devices are assigned the value 'consolidated' as category indicator.

The M2M Server 3a receiving said first category indicator per M2M Device basis applies during a step S-180 consolidation policies previously obtained, and already commented above in respect of embodiments shown in FIG. 12A to FIG. 12D, to the communication packets and determines that a unique communication session will carry both communication packets towards the M2M Media Handler 2a.

Then, taking into account the first category indicator received for each M2M Device and, optionally, a second category indicator indicating its own capacity to handle private, aggregated or consolidated communication sessions, which may be configured in the M2M Server or received from the M2M Registrar, the M2M Server submits the consolidated communication session during a step S-185 towards the M2M Media Handler 2a.

As in the previous embodiment shown in FIG. 8, also under this embodiment illustrated in FIG. 9 the M2M Media Handler 2a receiving the consolidated communication session extracts the individual information per M2M Device, prepares corresponding communication packets, and respectively submits the individual communication packets to the third and fourth M2M Devices 4a6 and 4a7 during respective steps S-190 and S-195.

In this respect, and not illustrated in any drawing, the M2M Media Handler might also apply consolidation policies to the individual M2M Devices involved in this communication to determine whether other consolidation is required or whether pure private individual information should be submitted. In particular, one of the individual M2M Devices involved in the consolidated communication received from the M2M Server might have been the M2M Device 4a-4, which is adapted to act as a further M2M Media Handler for M2M Devices 4a1, 4a2 and 4a5 as illustrated in FIG. 4. If this were the case, the M2M Media Handler 2a receiving the consolidated communication and extracting the individual information per M2M Device, may further apply consolidation policies to all the individual M2M Devices and may determine that individual communication packets should be submitted to M2M Devices 4a6 and 4a7 during respective steps S-190 and S-195, as illustrated in FIG. 9 and commented above, whereas a further consolidated communication should be submitted for M2M Devices 4a1, 4a2, 4a-4 and 4a5 towards the M2M Device 4a-4 acting as a further M2M Media Handler in the first capillary network 4a. Also particularly useful in this case, the M2M Device 4a-4 receiving such consolidated communication, whilst acting as a further M2M Media Handler for M2M Devices 4a1, 4a2 and 4a5, may deconsolidate the consolidated communication to extract the individual information per M2M Device, determine the portion of information applicable to itself as M2M Device 4a-4, and submit the individual communication packets to the M2M Devices 4a1, 4a2 and 4a5.

In another embodiment not illustrated in any drawing, the M2M Server may send consolidated communication towards the M2M Media Handler without indicating any particular M2M Device. The M2M Media Handler receiving such consolidated information may apply consolidation policies to determine what kind of information should be submitted to which M2M Device. In particular, the consolidated communication might be a software application, configuration or adaptation applicable to one or more M2M Devices as determined by the consolidation policies.

FIG. 11 illustrates another embodiment of the invention wherein a M2M Server 3a queries a M2M Registrar 1 during a step S-300 about more than one M2M Devices, namely about a first M2M Device 4a3 and about a second M2M Device 4a9, and wherein these M2M Device are identified by respective IP addresses. The M2M Registrar answers the query during a step S-305 indicating for each M2M Device the first category indicator, which in this exemplary embodiment is 'private' indicating that individual communication sessions are preferred.

Then, taking into account the first category indicator received for each M2M Device and, optionally, a second category indicator indicating its own capacity to handle private, aggregated or consolidated communication sessions, which may be configured in the M2M Server or received from the M2M Registrar, the M2M Server submits during a step S-310 a private or individual communication session for the first M2M Device 4a3, and another private or individual communication session during a step S-320 for the second M2M Device 4a9 towards the M2M Media Handler 2a.

The M2M Media Handler receiving such private or individual communication sessions eventually forwards during respective steps S-315 and S-325 corresponding private or individual communication session towards the first M2M Device 4a3 and the second M2M Device 4a9.

The above sequence of actions is carried out by different M2M entities enhanced to this end with new features and capabilities. In this respect, a person skilled in the art may realize that the M2M Media Handler and the M2M Server are provided with the means to perform quite similar actions and can be regarded as quite symmetrical structural elements located at edges of a telecommunication network. Bearing this in mind, the present invention provides for a M2M operating entity 5a-5b, which may act as a M2M Media Handler 2a, 2b, 2c, 4a-4 in charge of handling one or more M2M Devices 4a1-4a9 as well as a M2M Server 3a-3d in charge of handling one or more M2M Media Handlers in a M2M system.

As already commented above, and as illustrated in FIG. 13, this M2M operating entity may include a consolidation module 60 for receiving consolidation policies, the consolidation policies to be applied per M2M Media Handler basis, where the operating entity acts as a M2M Server, or the consolidation policies to be applied per M2M Server basis, where the operating entity acts as a M2M Media Handler; and a first storage for storing said consolidation policies. In this respect, this first storage may be an integral part of the consolidation module or a separate storage entity 10 combinable with other storage units in the M2M operating entity.

The M2M operating entity 5a may also include a processing unit 20 in cooperation with an output unit 40 for querying a M2M Registrar 1 about one or more M2M Device. Besides, the processing unit 20 may also act in cooperation with an input unit 50 for receiving from the M2M Registrar information about the one or more M2M Device indicating for each M2M Device the identifier of the M2M Media Handler handling the M2M Device, and at least one of: a first category indicator which the M2M Device is assigned and a second category indicator which the M2M Media Handler is assigned, wherein first and second category indicator values are selected from: private, aggregated and consolidated. In this respect, the input unit 50 and the output unit 40 may be provided as separate dedicated units, or as an integral input/output unit 30 connected with the processing unit 20. Additionally, the M2M operating entity 5a may also include a second storage for storing said information received from the M2M Registrar. In this respect, this second storage may be combined with the above first storage as a unique storage 10, within or outside the consolidation module, or the second storage may be a separate storage entity in the M2M operating entity.

In this M2M operating entity 5a suitable for acting as a M2M Media Handler or as a M2M Server, the processing unit 20 in cooperation with the input unit 50, the output unit 40, or with both, may be arranged for exchanging information with another M2M operating entity 5b by using, depending on the first, the second, or both received category indicators: an individual communication session for each one of the one or more M2M Device, where the received first category indicator, second category indicator, or both indicate private; or a communication session for all M2M Devices, where the received first category indicator, second category indicator, or both indicate aggregated; or a communication session for all M2M devices, where the received first category indicator, second category indicator, or both indicate consolidated, the communication session including information consolidated according to applicable consolidation policies.

Generally speaking, where the M2M operating unit 5a acts as a M2M Media Handler 2a, the M2M operating unit 5b is likely acting as a M2M Server 3a, or the M2M operating unit 5b might as well be a M2M Device 4a-4 acting as another M2M Media Handler, as illustrated in FIG. 5.

In an embodiment, the processing unit 20 may be arranged for applying one or more function included in the consolidation policies to one or more type of information transmissible by the one or more M2M Device 4a6, 4a7 in order to determine whether the consolidated information is communicated by a unique communication session or by more than one communication session. In this respect, the one or more function may be selected from: mathematical, statistical, thermodynamical, chemical, mechanical, positional, physiological, logical and social functions as well as combinations thereof.

In another, the consolidation module 60 may be arranged for receiving the consolidation policies either by configuration data provisioned by a provisioning system 6, as illustrated in FIG. 12D, or by retrieving the consolidation policies, from the M2M Registrar 1 or from another M2M operating entity, as illustrated in FIG. 12A-FIG. 12C, and in cooperation with the processing unit 20 and the input and output units 30.

In a further embodiment, where the M2M operating entity 5a acts as a M2M Media Handler 2a, the processing unit 20 and the input unit 50 of the M2M operating entity may be further arranged for collecting information from the M2M Devices connected thereto. Particularly useful in this case and aligned with corresponding advantageous features of the above method, the processing unit and the input unit may be further arranged for receiving an attach message from each M2M Device 4a6 connected with the M2M Media Handler; and, responsive to each attach message, the processing unit 20 and the output unit 40 may be further arranged for registering the corresponding M2M Device 4a6 towards the M2M Registrar 1, as shown in FIG. 10, the registration of each M2M Device including the M2M Device identifier and an identifier of the M2M Media Handler.

In a still further embodiment, where the M2M operating entity 5a acts as a M2M Media Handler 2a, and wherein the input unit 50 is further arranged for receiving one or more communication sessions from another M2M operating entity 5b acting as a M2M Server 3a, the processing unit 20 may be further arranged for determining whether any of these communication sessions aggregates or consolidates information for more than one M2M Device 4a6, 4a7, and for extracting from the aggregated, the consolidated, or both communication sessions individual information per M2M Device basis; and the output unit 40 may be further arranged for transmitting individual communication sessions corresponding to the one or more communication sessions received from the another M2M Server 3a, 5b, towards the one or more M2M Device.

As also commented above, and as illustrated in FIG. 14, there is provided a M2M Registrar 1 comprising: a configuration module 65 cooperating with a storage 15 for being provisioned with subscription for a number of M2M Devices 4a1'4a9, wherein each M2M Device is assigned an M2M Device identifier, a service profile with subscription data, and a first category indicator selected from: private, aggregated and consolidated; and for being configured with identifiers of one or more M2M Media Handler 2a, 2b, 2c, 4a-4 in charge of handling M2M Devices, wherein each M2M Media Handler is assigned a second category indicator selected from: private, aggregated and consolidated.

The M2M Registrar 1 also comprises a processing unit 25 in cooperation with an input unit 55 for receiving a registration for one of more M2M Devices 4a6, the registration of each M2M Device including the M2M Device identifier and an identifier of the M2M Media Handler 2a in charge of handling the M2M Device; and the processing unit in cooperation with the storage 15 and with an output unit 45 for answering a query about one or more M2M Device, query received at the M2M Registrar from at least one of: a M2M Media Handler 2a and a M2M Server 3a in charge of handling one or more M2M Media Handler, with a response indicating the identifier of the M2M Media Handler handling the M2M Device, and at least one of: the first category indicator which the M2M Device is assigned and the second category indicator which the M2M Media Handler is assigned.

In an embodiment of the invention for this M2M Registrar, the processing unit 25 in cooperation with the storage 15 and with the output unit 45 may be arranged for answering a query received from at least one of a M2M Server 3a and a M2M Media Handler 2a, wherein the query indicates a given M2M Media Handler identifier, with a response including at least one of: capabilities and second category indicator of a M2M Media Handler 2a corresponding to the given M2M Media Handler identifier, and with identifiers of those M2M Devices served by the M2M Media Handler corresponding to the given M2M Media Handler identifier.

In another, the configuration module 65 cooperating with the storage 15 may be arranged for being provisioned with capabilities for each M2M Device, capabilities selected from: one or more physical characteristic sensor, location, configuration parameters, and combinations thereof.

In a still another embodiment, the processing unit 25 in cooperation with the input unit 55 may be arranged for receiving, along with the registration of each M2M Device, capabilities for each M2M Device, capabilities selected from: one or more physical characteristic sensor, location, configuration parameters, and combinations thereof, and wherein the processing unit in cooperation with the storage may be arranged for storing the capabilities per M2M Device basis.

In a still further embodiment, the processing unit 25 in cooperation with the output unit 45, during the registration of each M2M Device, may be arranged for downloading towards the M2M Media Handler the first category indicator assigned to the M2M Device.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of handling subscription data for Machine-to-Machine (M2M) Devices in a M2M system, the method comprising:

provisioning a M2M Registrar with subscription data for a number of M2M Devices, wherein each M2M Device is assigned an M2M Device identifier and a first category indicator selected from: private, aggregated and consolidated;

configuring the M2M Registrar with identifiers of one or more M2M Media Handlers in charge of handling M2M Devices, each M2M Media Handler being assigned a second category indicator selected from: private, aggregated and consolidated;

registering two or more M2M Devices at the M2M Registrar, the registration of each M2M Device including the M2M Device identifier and an identifier of the M2M Media Handler in charge of handling the M2M Device; and answering a query about the two or more M2M Devices, the query indicating a given M2M Media Handler identifier and received at the M2M Registrar from at least one of: a M2M Media Handler and a M2M Server in charge of handling one or more M2M Media Handler, with a response including identifiers of those M2M Devices served by a M2M Media Handler corresponding to the given M2M Media Handler identifier, and at least one of: the first category indicator which each M2M Device is assigned and the second category indicator which the M2M Media Handler is assigned, wherein the at least one of the first and second category indicators is to be used by at least one of the M2M Media Handler and the M2M Server for determining exchange of information with communication session for M2M Devices.

2. The method of claim 1, further comprising answering a query received at the M2M Registrar from a M2M Server, the query indicating a given M2M Media Handler identifier, with a response including at least one of: capabilities and second category indicator of a M2M Media Handler corresponding to the given M2M Media Handler identifier.

3. The method of claim 1, wherein provisioning the M2M Registrar with subscription data for a number of M2M Devices includes provisioning capabilities for each M2M Device, capabilities selected from: one or more physical characteristic sensor, location, configuration parameters, and combinations thereof.

4. The method of claim 1, wherein registering two or more M2M Devices at the M2M Registrar includes indicating capabilities for each M2M Device, capabilities selected from: one or more physical characteristic sensor, location, configuration parameters, and combinations thereof.

5. The method of claim 1, wherein registering the two or more M2M Devices at the M2M Registrar, includes downloading from the M2M Registrar towards the M2M Media Handler the first category indicator assigned to the two or more M2M Devices.

6. A method of handling operation data of Machine-to-Machine (M2M) Devices in a M2M system, the method comprising:
    obtaining in at least one of a M2M Media Handler and a M2M Server, wherein the M2M Media Handler is in charge of handling M2M Devices and the M2M Server is in charge of handling M2M Media Handlers, consolidation policies to be applied per M2M Media Handler basis, where obtained in the M2M Server, and per M2M Server, where obtained in the M2M Media Handler;
    querying a M2M Registrar (1) from at least one of the M2M Media Handler and the M2M Server about two or more M2M Devices;
    receiving at the at least one of the M2M Media Handler and the M2M Server from the M2M Registrar information about the two or more M2M Devices indicating for each M2M Device the identifier of the M2M Media Handler handling the M2M Device, and at least one of: a first category indicator which the M2M Device is assigned and a second category indicator which the M2M Media Handler is assigned, wherein first and second category indicator values are selected from: private, aggregated and consolidated; and
    depending on the first, the second, or both category indicators received in at least one of the M2M Media Handler and the M2M Server:
        exchanging information between the M2M Media Handler and the M2M Server by using an individual communication session for each one of the two or more M2M Devices, where the received first category indicator, second category indicator, or both indicate private;
        exchanging information between the M2M Media Handler and the M2M Server by using one communication session for all M2M Devices, where the received first category indicator, the received second category indicator, or both indicate aggregated; and
        exchanging information between the M2M Media Handler and the M2M Server by using one or more communication sessions for those M2M devices where the received first category indicator, the received second category indicator, or both indicate consolidated, the one or more communication sessions including information consolidated as determined by applying consolidation policies to the information to be exchanged;
    wherein the consolidation policies allow consolidation of one or more type of information transmissible by the two or more M2M Devices by applying one or more function to said one or more type of information in order to determine whether the consolidated information is communicated by a unique communication session or by more than one communication session.

7. The method of claim 6, wherein the one or more function is selected from: mathematical, statistical, thermo-dynamical, chemical, mechanical, positional, physiological, logical and social functions as well as combinations thereof.

8. The method of claim 6, wherein obtaining consolidation policies at the M2M Server includes at least one of: configuring the consolidation policies at the M2M Server, retrieving the consolidation policies from the M2M Registrar and retrieving the consolidation policies from the M2M Media Handler.

9. The method of claim 6, wherein obtaining consolidation policies at the M2M Media Handler includes at least one of: configuring the consolidation policies at the M2M Media Handler, retrieving the consolidation policies from the M2M Registrar and retrieving the consolidation policies from the M2M Server.

10. The method of claim 6, further comprising: receiving at the M2M Media Handler an attach message for each M2M Device connected with the M2M Media Handler; and, responsive to each attach message, registering the corresponding M2M Device towards the M2M Registrar, the registration of each M2M Device including the M2M Device identifier and an identifier of the M2M Media Handler.

11. The method of claim 6, wherein exchanging information between the M2M Media Handler and the M2M Server further comprises collecting at the M2M Media Handler information from the M2M Devices connected thereto.

12. The method of claim 6, wherein exchanging information between the M2M Media Handler and the M2M Server includes: receiving the one or more communication sessions at the M2M Media Handler, determining whether any of these communication sessions aggregates or consolidates information for more than one M2M Device, extracting from the aggregated, the consolidated, or from both communication sessions individual information per M2M Device basis, and transmitting individual communication sessions corresponding to the one or more communication sessions received from the M2M Server towards the two or more M2M Device connected to the M2M Media Handler.

13. A Machine-to-Machine (M2M) operating entity for acting as a M2M Media Handler in charge of handling one or more M2M Devices, or as a M2M Server in charge of handling one or more M2M Media Handlers in a M2M system, the M2M operating entity comprising:
    a consolidation module configured to receive consolidation policies, the consolidation policies to be applied per M2M Media Handler basis, where the operating entity acts as a M2M Server, or the consolidation policies to be applied per M2M Server basis, where the operating entity acts as a M2M Media Handler;
    a first storage configured to store said consolidation policies;
    a processing unit in cooperation with an output unit configured to query a M2M Registrar about two or more M2M Devices;

the processing unit in cooperation with an input unit configured to receive from the M2M Registrar information about the two or more M2M Devices indicating for each M2M Device the identifier of the M2M Media Handler handling the M2M Device, and at least one of: a first category indicator which the M2M Device is assigned and a second category indicator which the M2M Media Handler is assigned, wherein first and second category indicator values are selected from: private, aggregated and consolidated;

a second storage configured to store said information received from the M2M Registrar; and the processing unit in cooperation with the input unit, the output unit, or with both configured to exchange information with another M2M operating entity by using, depending on the first, the second, or both received category indicators:
an individual communication session for each one of the two or more M2M Devices, where the received first category indicator, second category indicator, or both indicate private;
one communication session for all M2M Devices, where the received first category indicator, second category indicator, or both indicate aggregated; and
one or more communication sessions for those M2M devices where the received first category indicator, second category indicator, or both indicate consolidated, the one or more communication sessions including information consolidated as determined by applying consolidation policies to the information to be exchanged;
wherein the processing unit is configured to apply one or more function included in the consolidation policies to one or more type of information transmissible by the two or more M2M Devices in order to determine whether the consolidated information is communicated by a unique communication session or by more than one communication session.

14. The M2M operating entity of claim 13, wherein the consolidation module is configured to receive consolidation policies either by configuration data provisioned by a provisioning system, or by retrieving the consolidation policies, from the M2M Registrar or from another M2M operating entity, in cooperation with the processing unit and the input and output units.

15. The M2M operating entity of claim 13, where acting as a M2M Media Handler, and wherein the processing unit and the input unit are further configured to collect information from the M2M Devices connected thereto.

16. The M2M operating entity of claim 15, wherein the processing unit and the input unit are further configured to receive an attach message from each M2M Device connected with the M2M Media Handler; and, responsive to each attach message, the processing unit and the output unit are further configured to register the corresponding M2M Device towards the M2M Registrar, the registration of each M2M Device including the M2M Device identifier and an identifier of the M2M Media Handler.

17. The M2M operating entity of claim 13, where acting as a M2M Media Handler, and wherein the input unit is further configured to receive one or more communication sessions from another M2M operating entity acting as a M2M Server, the processing unit is further configured to determine whether any of these communication sessions aggregates or consolidates information for more than one M2M Device, and configured to extract from the aggregated, the consolidated, or from both communication sessions individual information per M2M Device basis, and wherein the output unit is further configured to transmit individual communication sessions corresponding to the one or more communication sessions received from the another M2M Server towards the two or more M2M Devices.

18. A Machine-to-Machine (M2M) Registrar for handling subscription data of M2M Devices in a M2M system, the M2M Registrar comprising:
a configuration module, cooperating with a storage, configured to be provisioned with subscription for a number of M2M Devices, wherein each M2M Device is assigned an M2M Device identifier and a first category indicator selected from: private, aggregated and consolidated; and further configured with identifiers of one or more M2M Media Handler in charge of handling M2M Devices, wherein each M2M Media Handler is assigned a second category indicator selected from: private, aggregated and consolidated;
a processing unit, in cooperation with an input unit, configured to receive a registration for two of more M2M Devices, the registration of each M2M Device including the M2M Device identifier and an identifier of the M2M Media Handler in charge of handling the M2M Device; and
the processing unit, in cooperation with the storage and with an output unit, configured to answer a query about the two or more M2M Devices, the query indicating a given M2M Media Handler identifier and received at the M2M Registrar from at least one of: a M2M Media Handler and a M2M Server in charge of handling one or more M2M Media Handler, with a response including identifiers of those M2M Devices served by a M2M Media Handler corresponding to the given M2M Media Handler identifier, and at least one of: the first category indicator which the M2M Device is assigned and the second category indicator which each M2M Media Handler is assigned, wherein the at least one of the first and second category indicators is to be used by at least one of the M2M Media Handler and the M2M Server for determining exchange of information with communication session for M2M Devices.

19. The M2M Registrar of claim 18, wherein the processing unit, in cooperation with the storage and with the output unit, are further configured to answer a query received from at least one of a M2M Server and a M2M Media Handler, wherein the query indicates a given M2M Media Handler identifier, with a response including at least one of: capabilities and second category indicator of a M2M Media Handler corresponding to the given M2M Media Handler identifier, and with identifiers of those M2M Devices served by the M2M Media Handler corresponding to the given M2M Media Handler identifier.

20. The M2M Registrar of claim 18, wherein the configuration module cooperating with the storage are further configured to be provisioned with capabilities for each M2M Device, capabilities selected from: one or more physical characteristic sensor, location, configuration parameters, and combinations thereof.

21. The M2M Registrar of claim 18, wherein the processing unit in cooperation with the input unit are further configured to receive, along with the registration of each M2M Device, capabilities for each M2M Device, capabilities selected from: one or more physical characteristic sensor, location, configuration parameters, and combinations thereof, and wherein the processing unit in cooperation with the storage are further configured to store the capabilities per M2M Device basis.

22. The M2M Registrar of claim 18, wherein the processing unit in cooperation with the output unit, during the registration of each M2M Device, are further configured to download towards the M2M Media Handler the first category indicator assigned to the M2M Device.

\* \* \* \* \*

UNITED STATES PATENT AND TRADEMARK OFFICE
CERTIFICATE OF CORRECTION

| | | |
|---|---|---|
| PATENT NO. | : 9,037,730 B2 | Page 1 of 1 |
| APPLICATION NO. | : 13/580030 | |
| DATED | : May 19, 2015 | |
| INVENTOR(S) | : Sanchez Herrero | |

It is certified that error appears in the above-identified patent and that said Letters Patent is hereby corrected as shown below:

In the specification

In Column 9, Line 42, delete "4a3,4a-4, 4a9" and insert -- 4a3, 4a4, 4a9 --, therefor.

In Column 9, Line 45, delete "4a-4" and insert -- 4a4 --, therefor.

In Column 14, Line 61, delete "4a-4," and insert -- 4a4, --, therefor.

In Column 15, Line 5, delete "4a-4 and" and insert -- 4a4 and --, therefor.

In Column 15, Line 6, delete "4a-4 acting" and insert -- 4a4 acting --, therefor.

In Column 15, Line 8, delete "4a-4" and insert -- 4a4 --, therefor.

In Column 15, Line 13, delete "4a-4," and insert -- 4a4, --, therefor.

In Column 15, Line 60, delete "4a-4" and insert -- 4a4 --, therefor.

In Column 16, Line 51, delete "4a-4" and insert -- 4a4 --, therefor.

In Column 17, Line 42, delete "4a-4" and insert -- 4a4 --, therefor.

In the claims

In Column 19, Line 36, in Claim 6, delete "(1)".

Signed and Sealed this
Sixth Day of October, 2015

Michelle K. Lee
*Director of the United States Patent and Trademark Office*